US011036228B2

(12) United States Patent
Koyama et al.

(10) Patent No.: US 11,036,228 B2
(45) Date of Patent: Jun. 15, 2021

(54) METHOD AND SYSTEM FOR STABILIZING A PAYLOAD

(71) Applicant: SZ DJI TECHNOLOGY CO., LTD., Shenzhen (CN)

(72) Inventors: Takashi Koyama, Shenzhen (CN); Zongyao Qu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 375 days.

(21) Appl. No.: 16/193,229

(22) Filed: Nov. 16, 2018

(65) Prior Publication Data

US 2019/0113922 A1    Apr. 18, 2019

Related U.S. Application Data

(63) Continuation of application No. PCT/CN2016/109516, filed on Dec. 12, 2016.

(51) Int. Cl.
*H02K 5/04*      (2006.01)
*G05D 1/00*      (2006.01)
(Continued)

(52) U.S. Cl.
CPC ......... *G05D 1/0094* (2013.01); *B64C 39/024* (2013.01); *B64D 47/08* (2013.01); *H02K 5/04* (2013.01); *H02K 11/20* (2016.01); *B64C 2201/127* (2013.01); *H04N 5/23299* (2018.08); *H04N 5/247* (2013.01)

(58) Field of Classification Search
CPC .............................. H02K 2201/18; H02K 5/04
See application file for complete search history.

(56) References Cited

U.S. PATENT DOCUMENTS 7,274,131 B2 *   9/2007   Li ........................... H02N 2/004
                                                              310/311
7,832,947 B2 *  11/2010   Takahashi .............. H02N 2/108
                                                              396/428
(Continued)

FOREIGN PATENT DOCUMENTS

CN         101162877 A      4/2008
CN         101277077 A     10/2008
(Continued)

OTHER PUBLICATIONS

The World Intellectual Property Organization(WIPO) International Search Report for PCT/CN2016/109527 dated Sep. 7, 2017 7 pages.
(Continued)

*Primary Examiner* — Dang D Le
(74) *Attorney, Agent, or Firm* — Anova Law Group, PLLC

(57) ABSTRACT

The present disclosure provides systems, methods, and devices related to the control and operation of a carrier for supporting a payload. In one aspect, a carrier may include: a stator configured to be coupled to a base support, wherein the stator include a spherical surface; and a frame operably coupled to the stator via a plurality of piezoelectric actuators, wherein the frame is configured to rotate relative to the stator about one or more rotational axes, and wherein the frame is configured to support a plurality of payloads in a manner that substantially balances a weight of the plurality of payloads relative to the stator.

21 Claims, 11 Drawing Sheets

(51) Int. Cl.
  *B64C 39/02* (2006.01)
  *B64D 47/08* (2006.01)
  *H02K 11/20* (2016.01)
  *H04N 5/232* (2006.01)
  *H04N 5/247* (2006.01)

(56) References Cited

U.S. PATENT DOCUMENTS

| | | | |
|---|---|---|---|
| 2001/0017665 A1 | 8/2001 | Ackermann et al. | |
| 2003/0007795 A1 | 1/2003 | Grober | |
| 2008/0238249 A1* | 10/2008 | Takahashi | H02N 2/108 310/317 |
| 2009/0039734 A1 | 2/2009 | Takahashi et al. | |
| 2013/0048792 A1 | 2/2013 | Szarek et al. | |
| 2016/0198088 A1 | 7/2016 | Wang et al. | |

FOREIGN PATENT DOCUMENTS

| | | |
|---|---|---|
| CN | 101291120 A | 10/2008 |
| CN | 101774431 A | 7/2010 |
| CN | 202103602 U | 1/2012 |
| CN | 204062367 U | 12/2014 |
| CN | 104679019 A | 6/2015 |
| CN | 104964134 A | 10/2015 |
| CN | 105438490 A | 3/2016 |
| CN | 105634324 A | 6/2016 |
| CN | 205311922 U | 6/2016 |
| CN | 105892218 A | 8/2016 |
| JP | 2000270569 A | 9/2000 |
| JP | 2007135266 A | 5/2007 |
| JP | 2009225591 A | 10/2009 |
| JP | 2011217540 A | 10/2011 |
| WO | 2014053003 A1 | 4/2014 |

OTHER PUBLICATIONS

The World Intellectual Property Organization (WIPO) International Search Report and Written Opinion for PCT/CN2016/109516 dated Jul. 27, 2017 8 pages.

\* cited by examiner

PART A

PART B

METHOD AND SYSTEM FOR STABILIZING A PAYLOAD

CROSS-REFERENCE TO RELATED APPLICATION

This application claims priority to International Application No. PCT/CN2016/109516, filed on Dec. 12, 2016, the entire contents of which are incorporated herein by reference.

BACKGROUND

A carrier is typically used as a rotatable support for payloads such as an imaging device (e.g., video camera, camera) or the like in a variety of applications. The carrier may be mounted onto a movable object (e.g., an aircraft, vehicle, ship, robot or a human) to carry the payload. When the movable object is in motion, the carrier may be subject to movement such as high-frequency vibration and/or attitude change of the movable object, which may affect operation of the payload device.

The carrier can be used to control a pointing direction of the payload such as line of sight (LOS) of an imaging device and/or isolate the payload from various disturbance induced by the operating environment. The geometries and sizes of carriers may limit the usefulness of some carriers (e.g., multi-frame carriers) in applications where small form factor, lightweight, and adequate mounting space for payloads are desired.

SUMMARY

In some instances, the carrier may be driven by a spherical actuator. A spherical actuator can be driven by an ultrasonic motor and various other mechanisms, such as parallel mechanism using wires to connect a spherical rotor to four single-axis motors or mechanism using electro-magnets.

The advantages of ultrasonic spherical motors are compact size, high motion precision, high responsiveness, direct driven, non-singularity in workspace, low noise, high efficiency or energy density, high holding torque and low speed, compatibility in strong magnetic fields.

However, existing stabilizing platform utilizing ultrasonic spherical motors cannot exploit the advantage of compactness due to the complex structures including the guiding rails or components of stabilizing platform such as encoders. Also, low speed of the ultrasonic spherical motor makes it difficult to be implemented on a movable object with high moving rate.

Accordingly, there exists a need for a compact carrier that can control and stabilize posture and attitudes of payloads with rapid response and high positioning accuracy, and that allows a plurality of payloads to be mounted.

The present disclosure addresses the need and provides related advantages as well. The subject apparatuses and methods described herein provide compact, low cost, high responsiveness, high power efficiency, and integrated stabilizing systems that can be used for different payloads and under different environmental conditions, and can stabilize and control payloads substantially in real-time as the payloads are in operation.

The present disclosure provides systems, methods, and devices related to the control and operation of a carrier for supporting a payload for a movable object such as an unmanned aerial vehicle (UAV). In some embodiments, a carrier is used to mechanically couple one or more payloads to a movable object and control the position and/or orientation of the payload relative to the movable object. However, the carrier may be subject to static torques induced by an imbalanced arrangement of the payloads that may affect the carrier configuration. Additionally, the carrier may be subject to complex external disturbances (e.g., e.g., high velocity change of the UAV, high frequency vibration, wind, temperature changes, external impacts, etc). The embodiments disclosed herein can take account of such factors, thus improving the accuracy of controlling the payload position and/or orientation using the carrier.

In one aspect, a carrier for supporting multiple payloads is provided. The carrier may comprise: a stator configured to be coupled to a base support, the stator comprising a spherical surface; and a frame operably coupled to the stator via a plurality of piezoelectric actuators. The frame included in the carrier may be configured to rotate relative to the stator about one or more rotational axes, and wherein the frame is configured to support a plurality of payloads in a manner that substantially balances a weight of the plurality of payloads relative to the stator.

In some embodiments, the frame of the carrier may comprise a ring located around the spherical surface of the stator. In some cases, the plurality of payloads supported by the carrier may have different weights and uniformly distributed along the ring. In some cases, the plurality of payloads may be attached along the ring such that a center of gravity of the carrier with the payloads is offset from a spherical center of the stator. In some cases, the center of gravity may be offset from the spherical center of the stator along a yaw axis. In some embodiments, the plurality of payloads supported by the carrier may comprise at least one functional payload and at least one non-functional payload. In some instances, at least one non-functional payload may be used to balance a weight of the at least one function payload relative to the stator.

In some embodiments, the carrier may further comprise at least one inertial sensor attached to the frame. Alternatively, the carrier may further comprise at least one inertial sensor attached to at least one payload selected from the plurality of payloads. In some embodiments, the at least one inertial sensor may be configured to detect a motion of the frame and/or at least one of a position, attitude, angular velocity, or angular acceleration of the frame. The motion of the frame may be detected without using an optical encoder or a magnetic field sensor. The at least one inertial sensor may comprise at least one of a gyroscope or an accelerometer. In some embodiments, a position of the at least one payload may be controlled using the carrier based on the detected motion of the frame.

In some embodiments, the base support may be located on or carried by at least one selected from the following: a movable object, a stationary object, or a living subject. In some cases, the movable object may comprise an aerial vehicle, a land-based vehicle, or a handheld mount. In some cases, the one or more payloads may comprise at least one camera and the at least one camera in some cases may be an omnidirectional camera.

In some embodiments, the stator of the carrier may be rigidly coupled to the base support. In some embodiments, the rotational axes that the frame is configured to rotate about may comprise at least one of a pitch axis, roll axis, or yaw axis.

In alternative embodiments, the stator of the carrier may be rotatably coupled to the base support via a motor. In some cases, the stator or the base support is attached to a rotor of the motor and a distance between the spherical surface of the stator to the base support is determined by a length of the motor. The length of the motor ranges from about 1 mm to about 20 mm. The rotational position of the motor may be determined using a magnetic field sensor. In some embodiments, the housing of the motor may be located at the base support or at the stator. In the case that the housing is at the stator, the housing may be disposed below the spherical surface of the stator. In some embodiments, the motor may be configured to rotate the stator relative to the base support about a yaw axis. In some cases, the rotational axes of the frame relative to the stator comprise at least one of a pitch axis or roll axis. In other cases, the rotational axes of the frame relative to the stator may further comprise the yaw axis.

In some embodiments, the plurality of piezoelectric actuators of the carrier may be attached to the frame. In some cases, the piezoelectric actuators are in contact with the spherical surface of the stator and the piezoelectric actuators are uniformly distributed along a circle of the spherical surface of the stator. The circle can be a small circle or a great circle of the spherical surface. When the stator is rotatable relative to the base support about a yaw axis using a motor: the plurality of piezoelectric actuators are uniformly distributed along a first circle, and configured to rotate the frame relative to the stator about a roll axis and a pitch axis. When the stator is rigidly attached to the base support: the plurality of piezoelectric actuators are uniformly distributed along a second circle, and configured to rotate the frame relative to the stator about a roll axis, a pitch axis, and a yaw axis. The second circle may have a smaller diameter than the first circle.

In some embodiments, the carrier may be powered by an external power source. In some cases, the external power source may be located at the base support. The external power source is a battery located onboard a movable object, and wherein the carrier is configured to be mechanically and electrically coupled to the movable object via the base support. The power is delivered from the battery to the carrier through an electrical coupling in the base support.

In yet a separate yet related aspect, the present disclosure provides a system. The system may comprise a movable object, and a carrier that is configured to be mounted on the movable object via the base support. The carrier is the same carrier as described previously.

According to a separate yet related aspect, the present disclosure provides a method of controlling the carrier as described herein. The method may comprise: controlling the plurality of piezoelectric actuators to effect movement of the frame on the spherical surface of the stator, wherein the movement of the frame comprises rotation of the frame relative to the stator about the one or more rotational axes.

In another aspect, the present disclosure provides a carrier. In practice, the carrier may comprise: a stator configured to be coupled to a base support, the stator comprising a spherical surface; a frame operably coupled to the stator via a plurality of piezoelectric actuators, wherein the frame is configured to rotate relative to the stator about one or more rotational axes, and wherein rotation of the frame is effectuated via the plurality of piezoelectric actuators; and at least one inertial sensor attached to the frame, wherein the inertial sensor is configured to detect a motion of the frame.

In yet a separate but related aspect, the present disclosure provides a system. The system may comprise: a movable object; and the carrier as described above. The carrier may be configured to be mounted on the movable object via the base support.

According to another separate but related aspect, the present disclosure provides a methods of actuating the carrier as described above. The method may comprise: detecting the motion of the frame using the at least one inertial sensor; and controlling the plurality of piezoelectric actuators to effect the rotation of the frame relative to the stator based on the detected motion of the frame.

In some embodiments, the inertial sensor utilized in the system or method may comprise at least one of a gyroscope or an accelerometer. In some cases, the inertial sensor may be configured to detect at least one of a position, attitude, angular velocity, or angular acceleration of the frame. In some cases, the motion of the frame may be detected without using an optical encoder or a magnetic field sensor.

In some embodiments, the frame utilized in the carrier may be configured to support one or more payloads. In some cases, at least one inertial sensor is located on at least one payload. Alternatively, at least one inertial sensor is located within a predetermined distance to at least one payload. A position of the at least one payload may be controlled based on the detected motion of the frame.

In some embodiments, the frame utilized in the carrier may be configured to support a plurality of payloads. In some cases, the plurality of payloads supported by the carrier may have different weights and uniformly distributed along the ring. In some cases, the plurality of payloads may be attached along the ring such that a center of gravity of the carrier with the payloads is offset from a spherical center of the stator. In some cases, the center of gravity may be offset from the spherical center of the stator along a yaw axis. In some embodiments, the plurality of payloads supported by the carrier may comprise at least one functional payload and at least one non-functional payload. In some instances, at least one non-functional payload may be used to balance a weight of the at least one function payload relative to the stator.

In some embodiments, the at least one inertial sensor is calibrated by obtaining: (1) a relative position between the frame and the base support, or (2) a relative position between the frame and a reference plane. The reference plane may be a ground surface.

In some embodiments, at least one other inertial sensor utilized in the method is located remotely from the carrier. In some cases, the at least one other inertial sensor is located on the base support. The inertial sensor on the frame comprises a first inertial sensor, and wherein the inertial sensor on the base support comprises a second inertial sensor. The first inertial sensor is initialized with respect to the second inertial sensor prior to actuation of one or more payloads supported on the carrier. The motion of the frame is detected using the first inertial sensor during the actuation of the one or more payloads.

In some embodiments, the first inertial sensor may be in communication with the second inertial sensor during actuation of one or more payloads supported on the carrier. In some cases, the motion of the frame is detected using the first inertial sensor and the second inertial sensor during the actuation of the one or more payloads. For example, the first inertial sensor is configured to measure an attitude angle of the frame about at least one of a pitch axis or a roll axis, and the second inertial sensor is configured to measure an attitude angle of the frame about a yaw axis. Alternatively, the second inertial sensor is configured to measure an attitude angle of the base support about a yaw axis. The frame of the carrier may be calibrated to the base support using in part the attitude angle of the frame and the attitude angle of the base support. The calibration comprises aligning the frame to the base support by adjusting the attitude angle of the frame based on the attitude angle of the base support.

In some embodiments, the plurality of piezoelectric actuators of the carrier may be configured to effect a movement of the frame based on a target angle. In some cases, one or more processors are individually or collectively configured to determine an input torque to the frame based on the target angle. The input torque can be determined using a feedback control loop. The feedback control loop is implemented using a proportional-integral-derivative (PID) controller comprising the one or more processors. The PID controller may be located on the carrier. Alternatively, the PID controller can be located remotely from the carrier such as the base support. The PID controller may be configured to determine an input angular velocity based on a difference between the target angle and an angle measured by the inertial sensor. The PID controller is configured to determine the input torque based on a difference between the input angular velocity and an angular velocity measured by the inertial sensor.

In some embodiments, the base support may be located on or carried by at least one selected from the following: a movable object, a stationary object, or a living subject. In some cases, the movable object may comprise an aerial vehicle, a land-based vehicle, or a handheld mount. In some cases, the one or more payloads may comprise at least one camera and the at least one camera in some cases may be an omnidirectional camera.

In some embodiments, the stator of the carrier may be rigidly coupled to the base support. In some embodiments, the rotational axes that the frame is configured to rotate about may comprise at least one of a pitch axis, roll axis, or yaw axis.

In alternative embodiments, the stator of the carrier may be rotatably coupled to the base support via a motor. In some cases, the stator or the base support is attached to a rotor of the motor and a distance between the spherical surface of the stator to the base support is determined by a length of the motor. The length of the motor ranges from about 1 mm to about 20 mm. The rotational position of the motor may be determined using a magnetic field sensor. In some embodiments, the housing of the motor may be located at the base support or at the stator. In the case that the housing is at the stator, the housing may be disposed below the spherical surface of the stator. In some embodiments, the motor may be configured to rotate the stator relative to the base support about a yaw axis. In some cases, the rotational axes of the frame relative to the stator comprise at least one of a pitch axis or roll axis. In other cases, the rotational axes of the frame relative to the stator may further comprise the yaw axis.

In some embodiments, the plurality of piezoelectric actuators of the carrier may be attached to the frame. In some cases, the piezoelectric actuators are in contact with the spherical surface of the stator and the piezoelectric actuators are uniformly distributed along a circle of the spherical surface of the stator. The circle can be a small circle or a great circle of the spherical surface. When the stator is rotatable relative to the base support about a yaw axis using a motor: the plurality of piezoelectric actuators are uniformly distributed along a first circle, and configured to rotate the frame relative to the stator about a roll axis and a pitch axis. When the stator is rigidly attached to the base support: the plurality of piezoelectric actuators are uniformly distributed along a second circle, and configured to rotate the frame relative to the stator about a roll axis, a pitch axis, and a yaw axis. The second circle may have a smaller diameter than the first circle.

In some embodiments, the carrier may be powered by an external power source. In some cases, the external power source may be located at the base support. The external power source is a battery located onboard a movable object, and wherein the carrier is configured to be mechanically and electrically coupled to the movable object via the base support. The power is delivered from the battery to the carrier through an electrical coupling in the base support.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
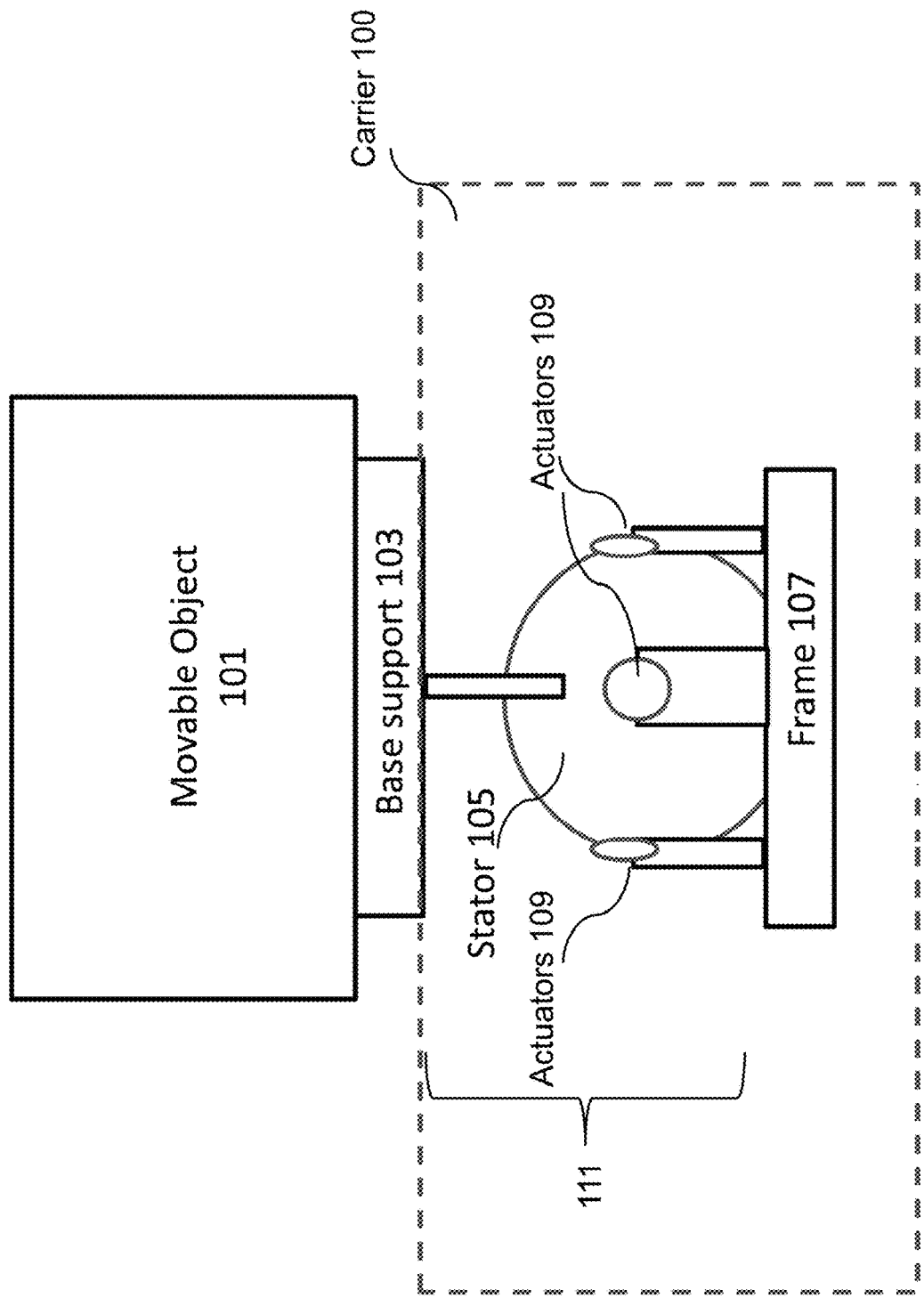
FIG. 1 is a block diagram of an exemplary system including a carrier for controlling and stabilizing a payload.

The present disclosure provides improved systems, methods, and devices for controlling a payload. In some embodiments, a payload is coupled to another object (e.g., a movable object such as a UAV, a stationary object, or a living subject) using a carrier that controls the position and/or orientation (attitude) of the payload. For instance, an instruction regarding a desired movement of the payload can be received (e.g., from a user and/or from a processor onboard the movable object) and a corresponding movement of the carrier to achieve the desired movement of the payload can be determined. Advantageously, the embodiments herein can provide a support for multiple payloads, using a spherical piezoelectric actuator with low inertial moment and compact structure, thus enhancing the responsiveness of the system to external disturbances and improving the accuracy of payload control.

As described herein, an external disturbance may include any movements, forces, and/or torques applied to the carrier and/or payload from a source external to the payload and carrier. For instance, external disturbances may be produced by the movable object connected to the payload and carrier, another movable object, environmental conditions (e.g., wind, precipitation), temperature changes, obstacles within the environment, or combinations thereof. The external disturbances may have various physical characteristics such as high frequency vibrations, large angular rate, large angular acceleration, linear velocity, etc. Accordingly, the carrier may be used to control the payloads subjected to external disturbances. In other cases, the carrier may be used to control the payloads without external disturbances.

In some embodiments, the payload carried by the carrier may include imaging devices (including but not limited to video camera or camera) and non-imaging devices (including but not limited to microphone, sample collector). The one or more payload devices may be the same type of payload device or different types of payload devices.

Examples of payload devices may include a device that collects data (e.g., imaging device (for visible light, infrared, ultra-violet (UV), geo-thermal or any other type of emission); a device that detects one or more particles; a device that detects a field such as a magnetic field, electric field, radio field; radiation detector; microphone, any type of sensor as described in greater detail elsewhere herein), a device that provides an emission (e.g., light emitter, image emitter, heat emitter, radio emitter, wireless signal emitter particle emitter), a device that interacts with the environment (e.g., robotic arm, sample collector, liquid distributer, pesticide or fertilizer sprayer), or any other type of device or combinations thereof. A payload device can also include one or more sensors for surveying one or more targets. Any suitable sensor can be incorporated into the payload, such as an image capture device (e.g., a camera), an audio capture device (e.g., a parabolic microphone), an infrared imaging device, or an ultraviolet (UV) imaging device. The sensor can provide static sensing data (e.g., a photograph) or dynamic sensing data (e.g., a video). In some embodiments, the sensor provides sensing data for the target of the payload device. Alternatively or in combination, the payload device can include one or more emitters for providing signals to one or more targets. Any suitable emitter can be used, such as an illumination source or a sound source. In some embodiments, the payload device can include one or more transceivers, such as for communication with a module remote from the movable object. Optionally, the payload device can be configured to interact with the environment or a target. For example, the payload device can include a tool, instrument, or mechanism capable of manipulating objects, such as a robotic arm.

In some embodiments, the payload device may include an imaging device configured to acquire and/or transmit one or more images of objects within the imaging device's field of view. Examples of an imaging device may include a camera, a video camera, smartphone/cell phone with a camera, or any device having the ability to capture optical signals. A non-imaging device may include any other devices such as for collecting or distributing sound, particles, liquid, or the like. Examples of non-imaging devices may include a microphone, a loud speaker, a particle or radiation detector, a fire hose, and the like.

The payload device may be supported by the carrier. The carrier can be provided for the payload device and the payload device can be coupled to the movable object via the carrier, either directly (e.g., directly contacting the movable object) or indirectly (e.g., not contacting the movable object). In some embodiments, the payload device can be integrally formed with the carrier. Alternatively, the payload device can be releasably coupled to the carrier. In some embodiments, the payload device can include one or more payload elements, and one or more of the payload elements can be movable relative to the movable object and/or the carrier.

The carrier can provide support to the payload device (e.g., carry at least part of the weight of the payload device). The carrier can include a suitable mounting structure (e.g., a stabilizing gimbal platform) capable of stabilizing and/or directing the movement of the payload device. In some embodiments, the carrier can be configured to control the state of the payload device (e.g., position and/or orientation) relative to the movable object. For example, the carrier can be configured to move relative to the movable object (e.g., with respect to one, two, or three degrees of translation and/or one, two, or three degrees of rotation) such that the payload device maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, or a payload target object).

In some embodiments, the carrier can be configured to permit movement of the payload device relative to at least a portion of the carrier and/or the movable object. The movement can be a translation with respect to up to three degrees of freedom (e.g., along one, two, or three axes) or a rotation with respect to up to three degrees of freedom (e.g., about one, two, or three axes), or any suitable combination thereof. In some cases, the movement may have trajectories along a spherical surface with respect to the movable object.

A stabilizing platform, such as a camera mount or a gimbal mount, may be provided for supporting and stabilizing one or more payload devices. The stabilizing platform may comprise a carrier including a frame assembly configured to hold the payload device, a motor assembly, a base support, and a controller assembly.

The controller assembly may include a sensing system configured to detect or obtain state information associated with the payload device. The state information may include velocity, orientation, attitude, gravitational forces, acceleration, position, and/or any other physical state experienced by the payload device. For example, the state information may include an angular and/or linear position, velocity and/or acceleration, (which may include an orientation or inclination of the payload device). In some embodiments, the sensing system may include an inertial measurement member comprising one or more gyroscopes, velocity sensors, accelerometers, magnetometers, and the like. In other embodiments, other types of state-detecting sensors may be used instead of or in addition to the inertial measurement member.

The controller assembly may also include a controller for calculating posture information associated with the payload device based on the state information obtained by the sensing system. For example, detected angular velocity and/or linear acceleration of the payload device may be used to calculate the attitude of the payload device with respect to a pitch, roll and/or yaw axis of the payload device.

In one aspect, the present disclosure provides an apparatus for controlling or stabilizing a payload. In practicing, the apparatus is a carrier comprising a stator configured to be coupled to a base support, a frame operably coupled to the stator via a plurality of piezoelectric actuators.

In a separate yet related aspect, the present disclosure provides a system. In practicing, the system may comprise a movable object, a carrier that is configured to be mounted on the movable object via a base support. In some embodiments, the carrier may comprise a stator configured to be coupled to a base support, a frame operably coupled to the stator via a plurality of piezoelectric actuators.

The carrier can be coupled to a movable object, a stationary object, a living subject, etc. For example, the carrier can be carried by a movable object moving relative to a fixed reference (e.g., ground). In another example, the carrier can be coupled to a fixed object that is stationary and not move relative to the ground.

FIG. 1 is a block diagram of an exemplary system including a carrier 100 for controlling and stabilizing a payload. A frame assembly 107 may comprise a payload support structure for carrying one or more payload devices, and one or more carrier components. The carrier 100 may comprise a stator configured to be coupled to a base support 103, a frame operably coupled to the stator via a plurality of piezoelectric actuators. The frame 107 may be rotatable about the stator 105. The stator 105 may be rigidly coupled to the base support 103. Alternatively, the stator 105 may be rotatably coupled to the base support 103. In some cases, the carrier 100 may be directly coupled to the movable object 101 without the use of a base support. In some instances, the one or more carrier components may include a plurality of sensors for detecting motions and positional information of the payloads and/or the frame assembly. The frame assembly 107 may be connected to a base of a movable object 101 via a motor assembly 111 and a base support 103. In some embodiments, the motor assembly may comprise a stator 105 and a plurality of actuators 109. In some instances, the carrier may be used to control the payload carried by a stationary object with respect to the ground such as a tripod for a camera. In this case, the carrier can be used to actively control postures of the various payloads with or without subjected to external disturbances. In other instances, the carrier may be used to control the payload carried by a movable object 101.

The movable object 101 may be a vehicle (e.g., an aircraft, an aerial vehicle, a land-based vehicle, ship, robot, or a handheld mount, etc). The base support 103 may be rigidly coupled to a pat of the movable object 101. The movable object 101 may be a living subject (e.g., animal, human). The payloads may be carried by the living subject via the base support 103.

Although some embodiments herein are presented in the context of UAVs, it shall be understood that the present disclosure can be applied to other types of movable objects, such as ground vehicles. Examples of movable objects suitable for use with the systems, methods, and devices provided herein are described in further detail below.

The movable objects described herein can be operated completely autonomously (e.g., by a suitable computing system such as an onboard controller), semi-autonomously, or manually (e.g., by a human user). The movable object can receive commands from a suitable entity (e.g., human user or autonomous control system) and respond to such commands by performing one or more actions. For example, the movable object can be a UAV controlled to take off from the ground, move within the air (e.g., with up to three degrees of freedom in translation and up to three degrees of freedom in rotation), move to target location or to a sequence of target locations, hover within the air, land on the ground, and so on. As another example, the movable object can be controlled to move at a specified velocity and/or acceleration (e.g., with up to three degrees of freedom in translation and up to three degrees of freedom in rotation) or along a specified movement path. Furthermore, the commands can be used to control one or more components, such as the components described herein (e.g., sensors, actuators, propulsion units, payload, etc.). For instance, some commands can be used to control the position, orientation, and/or operation of a payload such as a camera. In some cases, the base support may be releasably coupled to part of a housing of the movable object. In some embodiments, a stator is configured to be coupled to the base support and in contact with the plurality of piezoelectric actuators, such that the payload support structure can to move in multiple degrees of freedom relative to the base support. When an attitude of the movable object changes, the motion of one or more of the carrier components may be coordinated using one or more motors (e.g., direct drive motors) to ensure that an attitude of the payload support structure remains in a relatively stable configuration (for optimal operation of the payload device), regardless of changing attitudes of the movable object. Such stabilization platforms may provide stability to the payload device by detecting posture changes in the payload device and reverse compensating the detected posture changes.

In the present disclosure, the motor assembly 111 is configured to directly drive the frame assembly 107, causing the payload support structure supporting the payload device to rotate around one or more rotational axes. In some embodiments, the motor assembly may comprise a stator 105 and a plurality of actuators 109. In some embodiments, the stator 105 may have a spherical shape and the motor assembly 111 may allow the payload support/frame to rotate about up to three axes. The stator can have other shapes that are not substantially spherical, such as semi spherical, cylindrical, etc.

The motor assembly may use different types of driving techniques. In some embodiments, the motor is driven by piezoelectric actuators. Various other driving mechanisms can be used for actuating the spherical motor. For example, the spherical actuator can be driven by mechanical means using multiple single axis rotary motors and wires in way of parallel mechanism. In another example, the motor assembly can be driven by electro-magnetic permanent magnet motors. The actuators and stators may or may not be in contact.

In some embodiments, a plurality of piezoelectric actuators 109 may be used to drive the carrier. The piezoelectric actuators 109 may be configured to move the frame 107 about one or more axes with respect to the stator 105. The actuators may be in contact with the spherical stator such that a friction force may be generated to drive the frame and payloads to move with respect to up to three degrees of rotation. The spherical motor assembly may be based on ultrasonic techniques. In some embodiments, the spherical stator and the plurality actuators are referred to as spherical ultrasonic motor. In some cases, there is no intermediate motion transmission (e.g., gear train) to transmit the engine's motion to the output devices, such that the spherical ultrasonic motor assembly may have increased power efficiency. The ultrasonic motor may have high output torque without a reduction gear and holding torque for braking. The use of direct-drive motors offers reduced energy consumption while allowing for continuous control of the motor speed. Furthermore, using direct-drive motors, the response time can be reduced between the posture change of the movable object and the corresponding compensating change to the stabilizing platform due to faster response time of the ultrasonic spherical motors. Thus, the pointing direction of the payload device may be quickly adjusted (e.g., to point at a moving target). In some cases, a predetermined position or posture of the payload device may be maintained. Further, the payload device may be stabilized against unwanted movement such as vibrations or shakes caused by the movable object or other external factors. In cases where the payload device is an imaging device, the quality of images acquired by the payload device can be improved.

Figure 2:
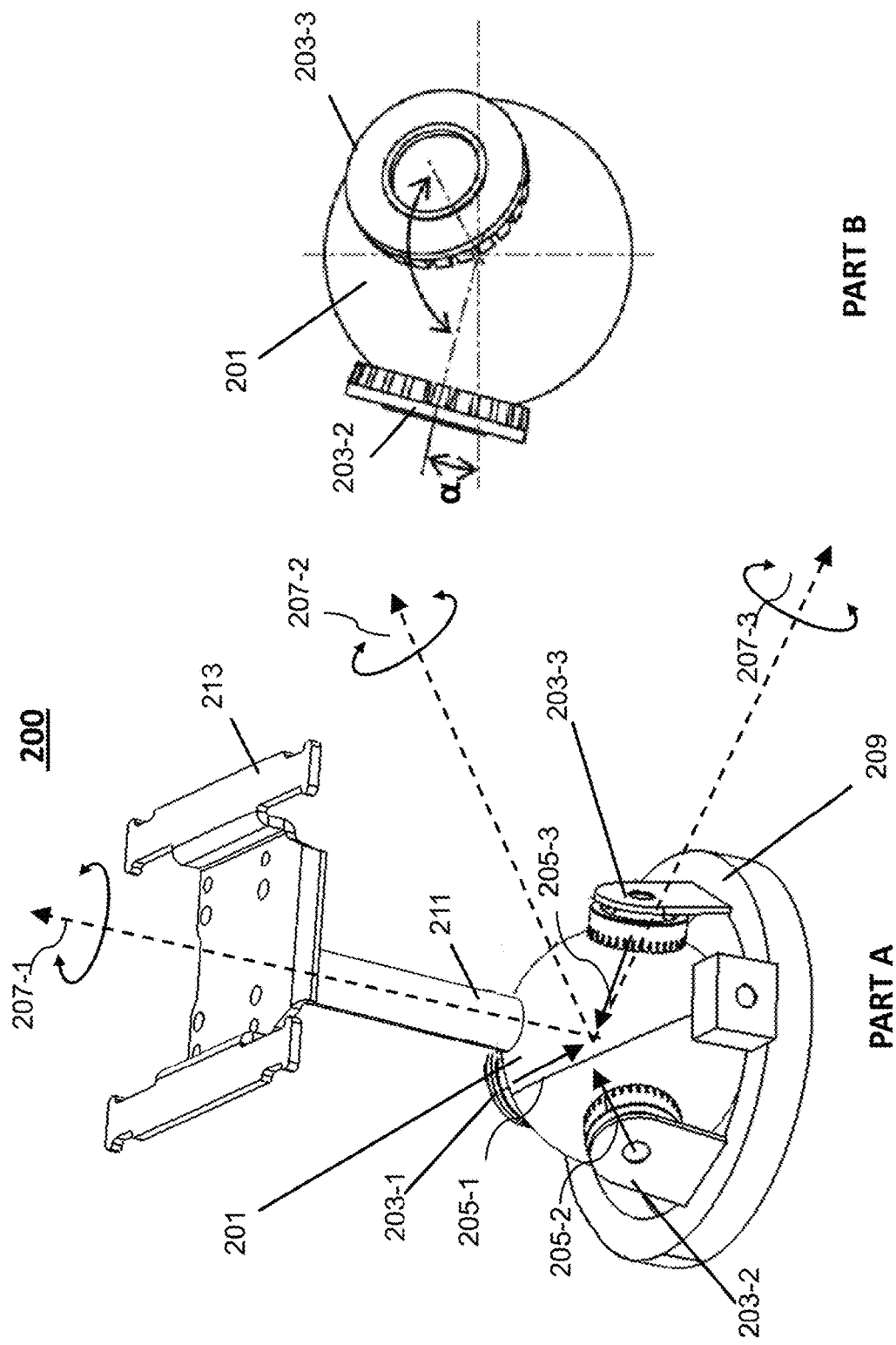
FIG. 2 illustrates an exemplary carrier for controlling a payload to move about multiple axes, in accordance with embodiments.

In some embodiments, the frame is configured to rotate relative to the stator about one or more rotational axes via a plurality of piezoelectric actuators that connect the frame and the stator and the frame. FIG. 2 illustrates an exemplary carrier for controlling a payload to move about multiple axes, in accordance with embodiments. As shown in part A of FIG. 2, a carrier 200 may comprise a spherical stator 201 and a plurality of piezoelectric actuators 203. In some embodiments, the piezoelectric actuators may include a first actuator 203-1, a second actuator 203-2, and a third actuator 203-3. Alternatively, any number of piezoelectric actuators may be used (e.g., four, five, six, or more than six actuators).

In some embodiments, the piezoelectric actuators may be piezoelectric vibrator elements that can be powered by electric voltage (e.g., AC voltage). The input voltage may be at ultrasonic frequency or near ultrasonic frequency. For example, the frequency of the input voltage can be the same or above 0.1 k Hz, 0.5 k Hz, 1 k Hz, 10 k Hz, 20 k Hz, 25 kHz, 30 kHz, 40 kHz, 50 kHz, etc. The position and angular velocity of the actuators and the spherical stator relative to each other may be controlled by the input voltage such as a phase difference or phase shift, a frequency of the voltage or a combination thereof. When an AC voltage is applied to the piezoelectric actuators, a standing wave may be generated. The piezoelectric actuator elements may expand or contract depending on the pole direction. Traveling waves may be negated by a combination of two stationary waves. The piezoelectric actuators may transmit energy to the spherical stator through contact with the stator. Various characteristics of the input signal such as amplitude, phase shift, frequency, etc can be used to control the actuators.

The position, generated torque and/or angular velocity of the ultrasonic motor can be controlled by the phase difference and/or the driving frequency of the input voltage and other factors such as the amplitude. For instance, the position control or torque control of the ultrasonic motor can be controlled by a variable phase and fixed frequency, fixed phase and variable frequency, and variable phase and frequency.

In some embodiments, the angular velocity vector of the frame 209 can be determined by the angular velocity vectors 205-1, 205-2, 205-3 of the three piezoelectric actuators 203-1, 203-2, 203-3. The composite of the three angular velocity vectors (i.e., angular velocity of the frame) can be represented by three components in the three orthogonal coordinate axes 207-1, 207-2, 207-3. The angular velocity of the frame 209 can be represented by the three components in the three orthogonal directions, the frame can therefore rotate about these axes with three degrees of freedom. In some embodiments, the rotational movement of the frame 209 can be with respect to three axes 207-1, 207-2, 207-3.

The three axes may correspond to roll, pitch and yaw coordinates. Alternatively, the movement of the frame may be about roll and pitch axes, or a single axis. In some embodiments, the spherical motor can be controlled to move about the roll, pitch and yaw axes. The rotational movement about each axis can be any range in any direction. The range can be a limited angle range. Alternatively, the rotational movement can be a revolving path about the spherical surface of the stator.

In some embodiments, the angular velocity of the frame 209 with respect to the stator 201 can be determined from the location of the plurality of piezoelectric actuators 203-1, 203-2, 203-3 relative to the stator 201 and the scalar components of the angular velocity vectors of the plurality of actuators. Directions of the three angular velocity vectors 205-1, 205-2, 205-3 may be determined based on the location of the actuators 203-1, 203-2, 203-3 with respect to the spherical stator 201. For example, as shown in part B of FIG. 2, the piezoelectric actuators 203-2, 203-3 (203-1 is not shown) may be arranged at an angle $\alpha$ to the great circle intersection plane. The angle $\alpha$ may determine the angular velocity component along the axis normal to the great circle plane such as the yaw axis 207-1. When the angle $\alpha$ is zero, the composite angular velocity of the frame may have zero component along the yaw axis direction, in which case the frame may be configured to rotate about roll and pitch axes. When the angle $\alpha$ is greater than zero degree, the angular velocity of the frame may have an angular velocity about the yaw axis in which case the frame may be configured to rotate about three axes (roll axis, pitch axis, and yaw axis). The angle $\alpha$ can be any degree such as from 0 to 85°. The angle may or may not be positive.

In some embodiments, the plurality of piezoelectric actuators 203-1, 203-2, 203-3 are uniformly distributed along a circle of the spherical surface of the stator. Alternatively, the plurality of piezoelectric actuators need not be uniformly distributed. As discussed previously herein, the circle can be determined by the angle $\alpha$. When a is zero, the plurality of piezoelectric actuators may be evenly spaced along a great circle of the spherical stator. A great circle can be defined as the circle on a sphere whose plan passes through the center of the sphere. When a is non-zero, the plurality of piezoelectric actuators may be arranged in a small circle. A small circle can be defined as the circle on a sphere whose plane does not pass through the center of the sphere. Other number of piezoelectric actuators may be used such as four, five, six, etc. When three piezoelectric actuators are included, they may be spaced every 120°.

In some embodiments, the plurality of piezoelectric actuators may be located along a small circle of the spherical surface of the stator. The small circle may be defined as the circle on the surface of the spherical stator with a radius smaller than the radius of the spherical stator. The plurality of piezoelectric actuators may be uniformly distributed along the small circle with an angle $\alpha$ that is not equal to zero. In this case, the piezoelectric actuators may be configured to rotate the frame relative to the spherical stator about a roll axis, a pitch axis, and a yaw axis. The spherical stator may or may not be able to move relative to the base support. In some embodiments, the stator may be rigidly attached to the base support, and thus the stator may have no relative movement relative to the base support. In alternative embodiments, the stator may be rotatable relative to the base support about a single axis such as the yaw axis. In other cases, the stator may be rotatable relative to the base support about two or more axes.

In alternative embodiments, the plurality of piezoelectric actuators may be located along a circle that is located at or near the great circle of the spherical. The plurality of piezoelectric actuators may be uniformly distributed along the circle with the angle α close to zero. In this case, the angular velocity of the frame may have small or zero component along the yaw axis and greater velocity components projected along the roll axis and pitch axis. For instance, the fraction of the velocity components projected along the roll axis and pitch axis may be up to 10%, 20%, 30%, 40%, 50%, 60%, 70%, 80%, 90%, and 100%. Accordingly, the piezoelectric actuators may be configured to rotate the frame relative to the spherical stator about the roll axis and pitch axis (e.g., 0% of the velocity is projected on the yaw axis). The spherical stator may or may not be able to move relative to the base support. In some embodiments, the stator may be rigidly attached to the base support, and thus the stator may have no relative movement relative to the base support. Accordingly the frame may be rotatable about the roll axis and pitch axis. In alternative embodiments, the stator may be rotatable relative to the base support about a single axis such as the yaw axis. Accordingly, the frame may be rotatable about the three axes (e.g., roll axis, pitch axis and yaw axis).

In some embodiments, the carrier may be powered by an external power source. Any suitable energy (e.g., electrical energy, magnetic energy, solar energy, wind energy, gravitational energy, chemical energy, nuclear energy, or any suitable combination thereof) may be used to generate an input voltage to actuate the piezoelectric actuators. In some cases, one or more circuitries, one or more processors or the like may also be powered by the power source. In some embodiments, the external power source may be located at the base support. In other embodiments, the external power source may be a battery located onboard a movable object. The carrier may be configured to be mechanically and electrically coupled to the movable object via the base support. For example, the power may be delivered from the battery located in the movable object to the carrier through an electrical coupling (e.g., cable, electric wiring) through the base support.

In some embodiments, the present disclosure provides a carrier 200 comprising a stator which is rigidly attached to the base support 213. The stator and the base support may not move relative to each other. For example, the stator 201 may comprise a mechanical structure 211 such as a shaft that is rigidly connected to the base support. The mechanical structure 211 can be formed of any shape such as a rod. The dimensional of the mechanical structure may or may not affect movement range of the stator relative to the base support. In some cases, the mechanical structure 211 may have dimensions that allow it to move into a space between two actuators or a space between an actuator and a payload. In some embodiments, a distance between the spherical surface of the stator to the base support may be determined by a length of the mechanical structure. The mechanical structure may have various geometric dimensions and sizes. Accordingly, the distance between the spherical stator and the base support can range from, for example 1 mm to 20 mm.

Alternatively, the stator may be rotatable relative to the base support. For example, the shaft of the spherical stator may be connected to a rotary motor. The rotational movement may be about a single rotational axis. In some embodiments, the rotational axes comprise at least one of a pitch axis, roll axis, or yaw axis. In some embodiments, the axis may be an axis aligned with the movable object's yaw axis. The single rotational axis needs not be orthogonal to the rotational axes of the spherical motor. The axis can be in any direction.

Figure 3:
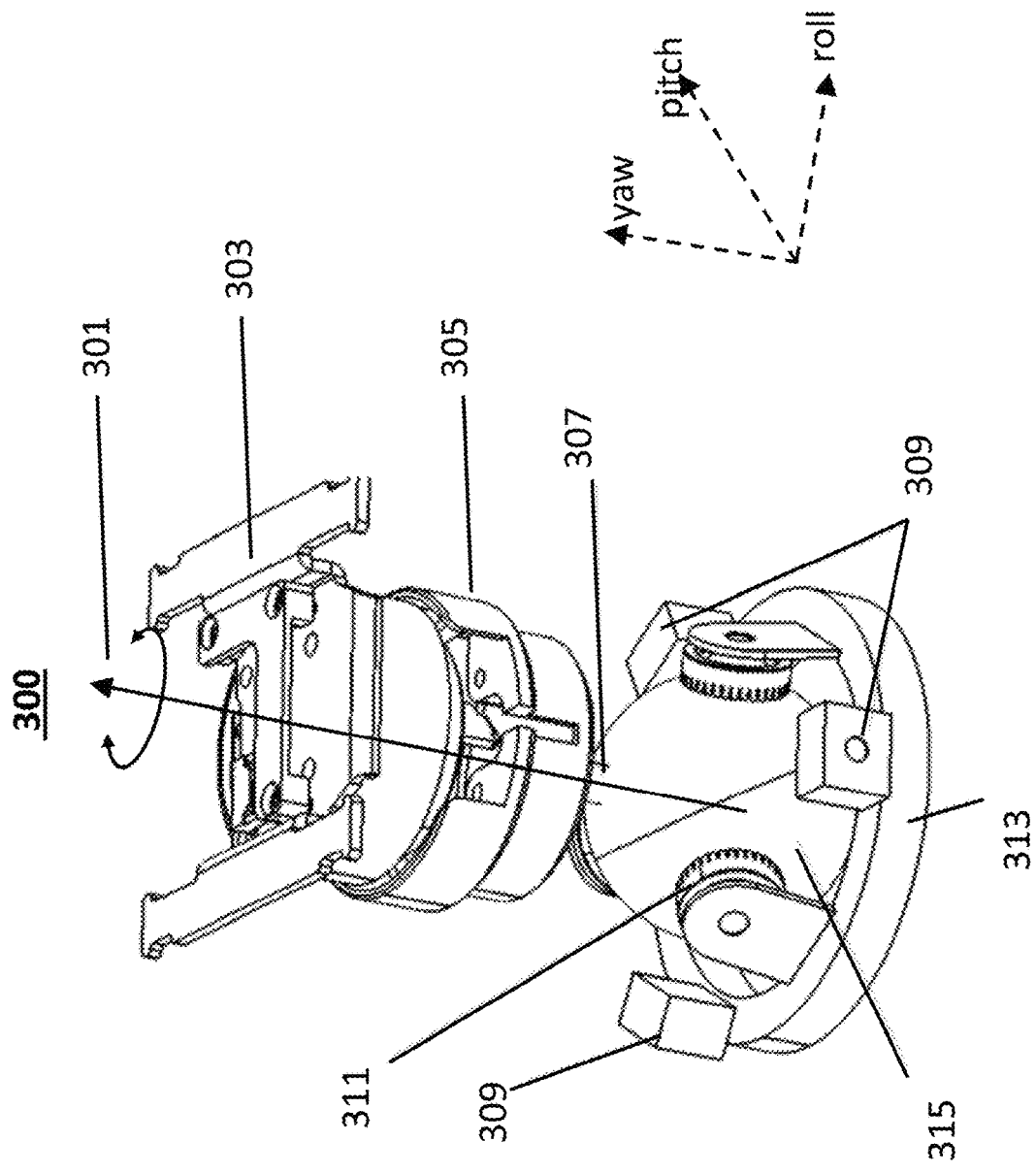
FIG. 3 illustrates an exemplary carrier comprising a stator rotatable about a yaw axis, in accordance with embodiments.

FIG. 3 illustrates an exemplary carrier comprising a stator rotatable about a yaw axis, in accordance with embodiments. As shown in FIG. 3, a carrier 300 may comprise a frame 313 for supporting one or more payloads. The frame 313 may be driven by a plurality of actuators 309 to rotate about one or more rotational axes relative to a spherical stator 315. In some embodiments, the rotational axes may comprise at least one of the roll axis, pitch axis, and yaw axis. The carrier may further be coupled to a base support 303 which is used to couple the carrier to another object. In this example, the stator 315 is configured to rotate about a yaw axis 301 with respect to the base support 303.

The carrier 300 may be configured to be mounted on another object via the base support 303. In some embodiments, the base support 303 may be coupled to another object. The object can be a movable object or a stationary object. The base support can be attached to any suitable portion of the frame, such as above, underneath, on the side(s) of, or within a body of the objects. In some embodiments, the base support 303 can be coupled to a surface (e.g., inner or outer surface) of the object, or can form part of the object (e.g., UAV housing). The base support can be mechanically coupled to the movable object such that the spatial disposition and/or motion of the base support correspond to the spatial disposition and/or motion of the movable object. The base support can be releasably coupled to the object. For instance, the base support can be attached to a UAV or handheld device via quick install/release means. The base support can be coupled to the movable objects via a rigid coupling, such that the base support does not move relative to the portion of the movable object to which it is attached. Alternatively, the coupling between the base support and the movable object can permit movement of the base support relative to the movable object. The coupling can be a permanent coupling or non-permanent (e.g., releasable) coupling. Suitable coupling methods can include adhesives, bonding, welding, mechanical locking structures, and/or fasteners (e.g., screws, nails, pins, etc.). In some embodiments, the coupling between the base support and the movable object comprises shock absorbers or dampers that reduce vibrations or other undesirable mechanical movements from being transmitted from the movable object body to the carrier. Optionally, the base support can be integrally formed with a portion of the movable object. Optionally, the carrier may be carried by a living subject without the base support or without coupling means. For example, the carrier may be held by a human directly without the base support or coupling means.

In some embodiments, the rotational movement of the stator may be driven by any types of actuators such as a motor 305. The motor may or may not be a DC servo motor. The motor may or may not be a direct drive motor. In some cases the actuator can be a DC servo motor may or may not use transmission components (e.g., gear trains). The actuator 305 can be located in the carrier. Alternatively, the actuator can be located in an object that is coupled to the carrier. The actuator 305 may apply torque to the stator 315 via a mechanical structure 307 such as an output shaft of the actuator and/or the shaft of the stator, and the transmission or connecting components. The mechanical structure 307 may correspond to the mechanical structure 211 in FIG. 2. In some embodiments, a distance between the spherical surface of the stator and the base support may be determined by a length of the mechanical structure. The mechanical structure may have various geometric dimensions and sizes. Accordingly, the distance between the spherical stator and the base support can range from, for example 1 mm to 20 mm. The stator 315 may be rotated by the motor about the yaw axis in any direction (e.g., clockwise and counterclockwise) and the rotation angle can be in any range such as revolutionary rotation. In some embodiments, the rotational movement about the yaw axis as actuated by the motor can be detected or measured by one or more sensors located on the motor. For example, the sensor(s) may be located on an output shaft of the motor and configured to measure the angular velocity or position of the motor such as an encoder or angular potentiometer. In some cases, the sensor(s) may be a magnetic field sensor. In some embodiments, the actuator may be enclosed in a housing. The housing may be located anywhere between the base support and the spherical stator, and the sensor(s) may be located in the housing. In other embodiments, the actuator may be located at the stator. For instance, the actuator may be located in a hollow portion of the spherical stator or below the spherical surface of the stator.

As the stator 315 can be controlled to rotate about a yaw axis relative to the base support 303, the frame 313 can be controlled to rotate about at least a roll axis and/or pitch axis relative to the spherical stator 315. The frame 313 may be controlled to rotate about up to three axes comprising at least a yaw axis. The composite angular velocity of the frame 313 may be a combination of (1) the rotational movement of the stator relative to the base support and (2) the rotational movement of the frame relative to the stator.

The plurality of piezoelectric actuators 309 may be located along a circle located at or near the great circle of the spherical stator (i.e., at small angle α). As discussed previously, the plurality of piezoelectric actuators 309 are configured to rotate the frame 313 about at least two axes (i.e., roll axis and pitch axis) with respect to the stator. The angular velocity of the frame 313 may have a smaller fraction of components projected along the yaw axis direction compared to the embodiments in which the piezoelectric actuators located along a small circle of the spherical stator. In an example, when the plurality of piezoelectric actuators are located along the great circle, the angular velocity component along the yaw axis may be zero.

The frame 313 may be rotated relative to the base support 303 with respect to up to three axes. Various motion characteristics of the frame 313 such as the angular velocity, attitude, position can be controlled by the carrier 300. The frame 313 may be operably coupled to the stator via the plurality of piezoelectric actuators such that the frame 313 may be configured to rotate relative to the stator.

In some embodiments, the frame 313 can be coupled to the plurality of actuators 311 via a rigid coupling, such that the frame 313 does not move relative to the portion of the actuators to which it is attached. In some embodiments, a plurality of connectors may be used to mechanically connect the frame and the plurality of piezoelectric actuators. In some embodiments, the connectors may be designed to provide a preload press contact between the piezoelectric actuators and the spherical stator. The value of the preload may be determined to meet the torque and speed requirements. The connectors can be formed of any shape, and may be made of suitable materials such as metal to provide enough pressure to the actuators. Various coupling means can be used between the frame 313 and the connectors. The coupling can be a permanent coupling or non-permanent (e.g., releasable) coupling. Suitable coupling methods can include adhesives, bonding, welding, and/or fasteners (e.g., screws, nails, pins, etc.). The connectors can be integrally formed with the frame.

The frame 313 can have a variety of shapes. In some embodiments, the frame may comprise a structure having a ring shape. The ring shape structure may provide enough space or surfaces to support multiple payloads as well as attachment to the plurality of holding structures of the actuators. In some embodiments, the ring shape structure may have geometries that are large enough to surround a small circle of the spherical stator. For example, the ring shape structure may have an inner radius greater than the radius of the small circle by which the spherical stator is surrounded such that the frame may be permitted to rotate around the spherical stator without interfering with any portion of the spherical surface.

Figure 5:
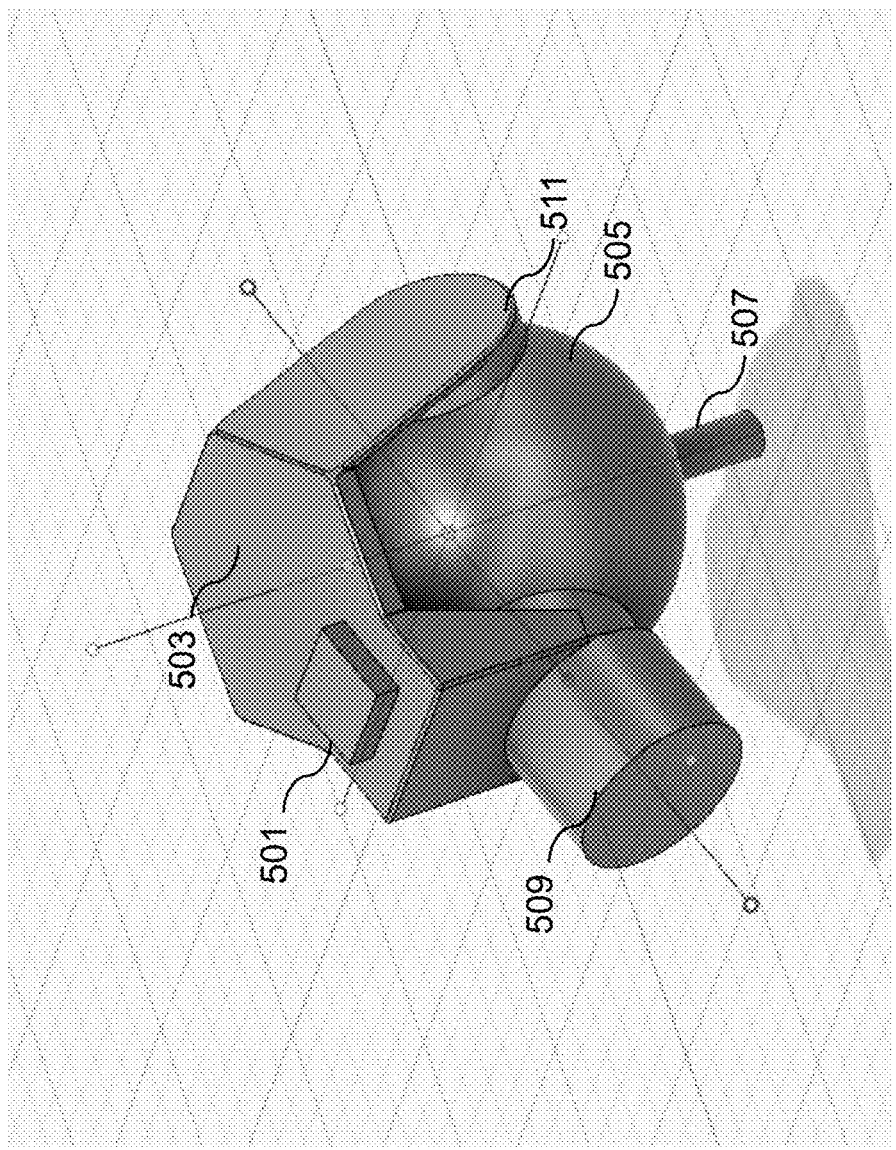
FIG. 5 illustrates an example of an inertial sensor attached to the frame of a carrier, in accordance with embodiments.

In alternative embodiments, the frame may have other shapes such as a plate structure (e.g., the frame structure in FIG. 5). The plate may have various shapes, such as circular or polygonal shape. The frame, for example can be triangular shape, square, hexagonal, etc. The shape of the frame may or may not be symmetric about a rotational axis. In some embodiments, the frame may have a top surface below the spherical stator. The surface need or need not be flat. The surface of the frame may or may not directly contact the spherical surface of the stator.

The frame 313 may be positioned below or around the spherical stator. In some embodiments, the position of the frame may be determined based on the dimension of the connectors as discussed previously. The frame may not direct contact the spherical surface of the stator such that the frame can rotate freely without interfering with the stator. The frame may provide enough space and surface for supporting one or more payloads.

The frame 313 may provide support to a variety of payloads 309. The types of payloads 309 that can be carried by the frame have been described elsewhere herein. The payloads 309 can be situated on any suitable portion of the frame, such as above, underneath, on the side(s) of, or within a body of the frame. In some embodiments, one or more payloads 309 can be coupled to a surface (e.g., inner or outer surface) of the frame, or can form part of the frame. Some payloads can be mechanically coupled to the frame such that the spatial disposition and/or motion of the payload correspond to the spatial disposition and/or motion of the frames. The payloads 309 can be coupled to the frame 313 via a rigid coupling, such that the payloads do not move relative to the portion of the frame to which it is attached. Alternatively, the coupling between the frame and the payloads can permit movement of the payloads relative to the frame. The coupling can be a permanent coupling or non-permanent (e.g., releasable) coupling. Suitable coupling methods can include adhesives, bonding, welding, and/or fasteners (e.g., screws, nails, pins, etc.). Optionally, the payloads can be integrally formed with a portion of the frame. In alternative embodiments, the payloads may not necessarily be directly coupled to the payloads, but may be connected to another component that is directly coupled to the frame.

In some embodiments, a plurality of payloads may be attached to the frame. The plurality of payloads may be uniformly distributed along the ring. Alternatively, the plurality of payloads need not be uniformly distributed. The plurality of payloads may have similar weights such that when they are evenly spaced along the frame, a center of gravity of the carrier with the payloads may be near or on a rotation axis (e.g., yaw axis). In alternative embodiments, the plurality of payloads may have different weights. The payloads may be arranged in the locations such that the total weight of the carrier with payloads may be balanced with respect to a rotation axis (e.g. yaw axis).

Figure 4:
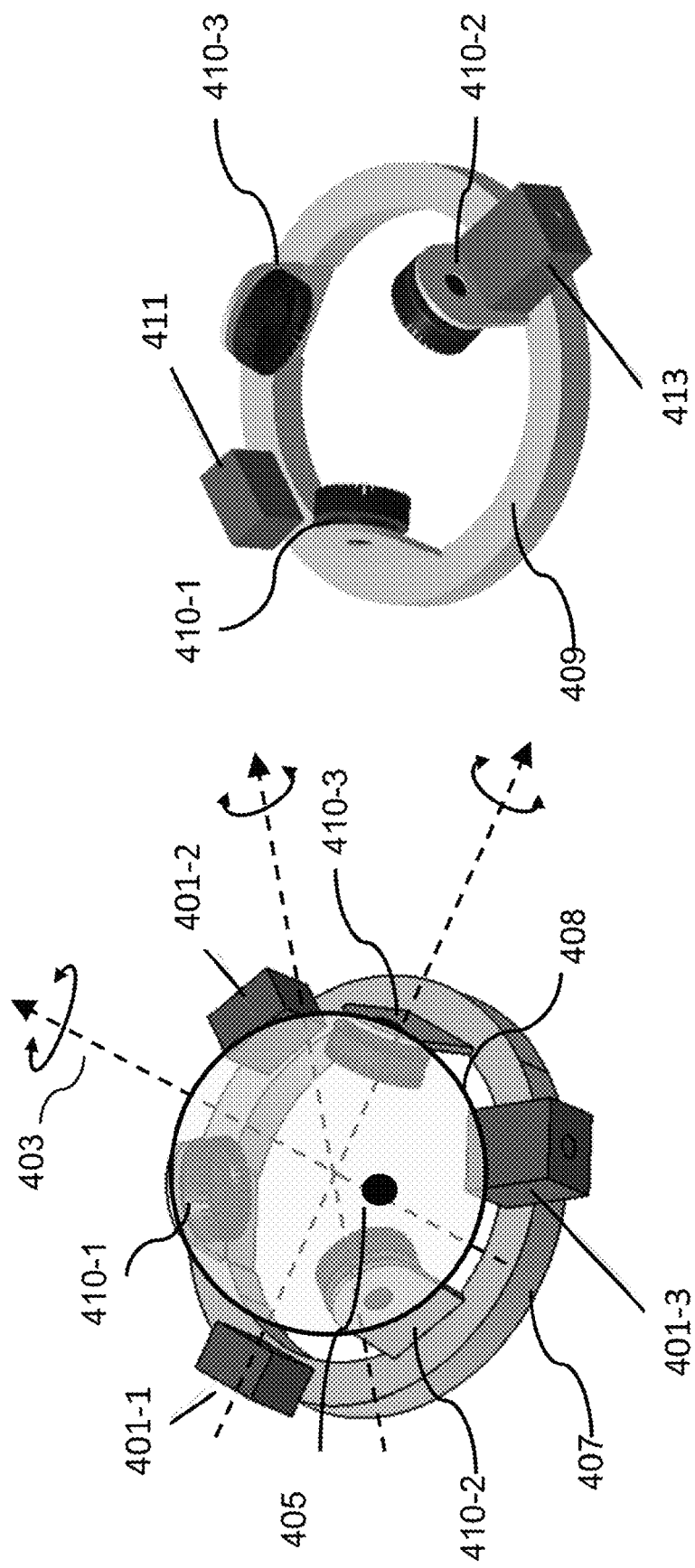
FIG. 4 shows examples the multiple payloads located on a frame, with respect to embodiments of the disclosure.

FIG. 4 shows examples the multiple payloads located on a frame, in accordance with some embodiments of the disclosure. A plurality of payloads 401-1, 401-2, 401-3 may be supported on a frame 407. Any number of payloads can be supported by the frame such as two, three, four, five, six, seven, eight, nine, ten, etc. In some embodiments, the plurality of payloads 401-1, 401-2, 401-3 may have the same or similar weights. The plurality of payloads 401-1, 401-2, 401-3 may or may not have the same dimensions, geometrics or shapes. The plurality of payloads may be uniformly distributed on the frame 407. For example, the plurality of payloads may be evenly spaced along the ring shaped frame 407. The payloads may be arranged such that the total weight of the carrier and the payloads may be balanced with respect to a rotational axis. The rotational axis may comprise at least a yaw axis 403. The rotational axis need not be aligned with a symmetrical axis or principal axis of the carrier. For example, the rotational axis may not pass through the spherical center, in which case the plurality of payloads may be balanced with respect to the rotational axis rather than the symmetrical axis of the carrier.

In some cases, one or more functional payloads need to be stabilized or controlled at a desired attitude. For instance, one or more cameras may be required to captures images while the cameras are leveled or parallel to a horizontal plane such as the ground. It may be advantageous to have the payloads supported by the carrier balanced at a desired attitude (e.g., horizontal orientation) such that the torque induced by an offset gravity force may be reduced.

The location of the multiple payloads can be located to any portion of the frame 407. The frame 407 may be connected to a plurality of piezoelectric actuators 410-1, 410-2, 410-3. The payload can be located between two actuators such as the payload 410-2 that is situated between the actuators 410-1, 410-3. The payload can be located at the actuators such as in PART B of FIG. 4, the payload 413 is situated at the actuator 410-2.

The location of the multiple payloads may be arranged such that the weight of the carrier with payloads may be balanced with respect to a desired attitude. In some cases, the location of the multiple payloads may be selected so that the payloads are balanced with respect to a rotational axis such as the yaw axis. When the payloads are balanced about the yaw axis, there may be reduced torque applied to the rotational axes (e.g., roll axis, pitch axis) to control them at the balanced position. The location of each payload with respect to the yaw axis may be determined based on a weight of each payload. In some cases, the carrier may be substantially symmetric about the yaw axis. In this case, when the multiple payloads have the same or similar weights, they may be distributed evenly about the yaw axis. When the multiple payloads have different weights, they may be arranged in the location according to their weights to balance each other. For instance, the relatively heavier payload may be arranged close to the yaw axis, and the light payload may be located far from the yaw axis. In other embodiments, the carrier may not be symmetric about the yaw axis. In this case, the multiple payloads with or without the same weights may be arranged on the frame taking into account the gravity center of the carrier with respect to the yaw axis. For example, if the gravity center of the carrier is to the left of the yaw axis, the payloads may be arranged such that the gravity center of the payload may be to the opposite side of the yaw axis to balance the carrier.

The gravity center of the carrier with the plurality of payloads 405 may be close to or on the yaw axis 403. In some embodiments, the gravity center 405 need not coincide with the center of the spherical stator. The gravity center 405 may be offset from the spherical center of the stator 408 along the yaw axis 403. The gravity center may be offset from above or below of the spherical center of the stator. In other embodiments, the gravity center may coincide with the spherical center such that the gravity center coincides with the pivot of the carrier about three axes.

In some embodiments, the plurality of payloads 411, 413 may have different weights, sizes, or shapes as shown in part B of FIG. 4. The plurality of payloads 411, 413 may or may not have the same dimensions, geometrics or shapes. The plurality of payloads may be located on the frame. The payloads may be arranged such that the total weight of the carrier and the payloads may be balanced with respect to a rotational axis such as a yaw axis. In some embodiments, additional payload(s) may be introduced for counterbalancing the weight of other payloads. For example, a camera 413 may be carried by the frame 409 and another payload 411 may be placed in an opposite position to counterbalance the weight of the camera 409. The weights of the camera 413 and the payload 411 need not be the same. In some embodiments, at least one of the cameras is an omnidirectional camera. In another example, more than one payload may be used to counterbalance one heavy payload. For instance as shown in part A of FIG. 4, payload 401-3 may be a large camera balanced by two smaller cameras 401-1 and 401-2.

The payload 411 and payload 413 may both be functional payloads. The payload 411 and payload 413 need not be the same type of payloads. In some cases, the payload 411 may be a non-functional payload used to balance the weight of the functional payload 413. The non-functional payload may be the payload that is not functioning concurrently with the functional payload. The non-functional payload may not be in operation when the functional payload is controlled by the carrier. The non-functional payload may or may not be used for other purposes other than balancing the weight. In some cases, the non-functional payload may be used during a time when the functional payload is not in use. In some cases, the non-functional payload can be a structural element attached to or formed with the frame.

In some embodiments, the plurality of payloads may comprise at least one functional payload and at least one non-functional payload. In some cases, the at least one non-functional payload is used to balance a weight of the at least one functional payload relative to the stator. The functional payload can be a payload configured to perform an operation or function. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

In alternative embodiments, the payload(s) that used to balance a weight of the functional payload(s) can also be functional. For example, the big camera 401-3 may be balanced by the two small cameras 401-1, 401-2. The small cameras can sometimes operate concurrently with the big camera 401-3. The small cameras can be backup cameras that may operate when the major camera 401-3 malfunctions or is not in use. For example, the major camera 401-3 can be replaced by one of the small cameras by rotating the frame about the yaw axis such that the small camera 401-1 may take images from the viewing direction of the major camera.

The multiple payloads carried by the frame may be direction sensitive. For example, the payloads may be an imaging device of which the line of sight may be controlled by the carrier. In this case, the location of the multiple payloads may be determined based on the directional requirement of the payloads as well as the weight balance of the carrier. In some embodiments, a non-directional payload may be used to balance a weight of a directional payload. Alternatively, all of the payloads may be directional and be located to have a gravity center of the carrier with the payloads close to or on a rotational axis (e.g., yaw axis).

The multiple payloads may be stabilized or controlled by the carrier simultaneously. In some cases when the multiple payloads are directional sensors, such as cameras, they may be controlled to capture images from different view angles meanwhile be stabilized by the carrier.

In some cases, the multiple payloads may comprise at least a camera. In one example, 360 degree imaging may be provided with aid of multiple image capture devices located around a circular base (e.g., in the sensor array). The image capture devices may be configured to capture static images (e.g., snapshots) or dynamic images (e.g., video). The image capture devices can simultaneously capture static images (e.g., snapshots) or dynamic images (e.g., video). Multiple images from multiple image capture devices may be stitched together to form a smooth uninterrupted image (e.g., 90 degrees, 180 degrees, 270 degrees, 360 degrees). The camera may collect images in high definition (HD). In some instances, the camera may collect images in color or black and white. The cameras may collect images at a fast frame rate (e.g., 25 Hz or higher, 50 Hz or higher, 75 Hz or higher, 100 Hz or higher). Cameras may capture images at a video rate. Cameras may optionally have high-sensitivity daytime/nighttime imaging capabilities with adaptive dynamic range. Compression, such as H.264 dual bandwidth video bandwidth compression may occur to permit low-bandwidth streaming and high-bandwidth recording. The camera may use various imaging techniques, for example, one or more three-dimensional distance scans may be provided from a laser scanner (LIDAR) or use infrared sensor, etc.

In other cases, the multiple payloads may comprise more than one camera. The multiple cameras may capture images from different view angle simultaneously, and the images may be processed to achieve a wide view angle images or depth of view.

In another aspect, the present disclosure provides a method for controlling the carrier as described elsewhere herein. In practicing, the method may comprise controlling a plurality of piezoelectric actuators to effect movement of the frame on the spherical surface of the stator, wherein the movement of the frame comprises rotation of the frame relative to the stator about the one or more rotational axes.

In another aspect, the present disclosure provides a carrier. In practicing, the carrier may comprise a stator config- ured to be coupled to a base support that comprises a spherical surface; a frame operably coupled to the stator via a plurality of piezoelectric actuators, wherein the frame is configured to rotate relative to the stator about one or more rotational axes, and wherein the oration of the frame is effectuated via the plurality of piezoelectric actuators; and at least one inertial sensor attached to the frame, wherein the inertial sensor is configured to detect a motion of the frame.

In another yet related aspect, the present disclosure provides a system. In practicing, the system may comprise a movable object and a carrier which is configured to be mounted on the movable object via a base support. In some embodiments, the carrier may comprise a stator configured to be coupled to the base support that comprises a spherical surface; a frame operably coupled to the stator via a plurality of piezoelectric actuators, wherein the frame is configured to rotate relative to the stator about one or more rotational axes, and wherein the oration of the frame is effectuated via the plurality of piezoelectric actuators; and at least one inertial sensor attached to the frame, wherein the inertial sensor is configured to detect a motion of the frame.

In another related aspect, the present disclosure provides a method. In practicing, the method may comprise detecting the motion of the frame suing the at least one inertial sensor; and controlling the plurality of piezoelectric actuators to effect the rotation of the frame relative to the stator based on the detected motion of the frame.

In some embodiments, the motion of the frame may be detected without using an optical encoder or a magnetic field sensor. The motion of the frame may be detected using an inertial sensor during the actuation of the one or more payloads. One or more sensors may be used to detect the motion of the frame or payloads. The payload sensor(s) can be any sensor suitable for obtaining data indicative of a spatial disposition (e.g., position, orientation, angle) and/or motion characteristic (e.g., translational (linear) velocity, angular velocity, translational (linear) acceleration, angular acceleration) of a payload, such as an inertial sensor.

In some embodiments, the inertial sensor used to detect the motion of the frame may comprise at least one of a gyroscope or an accelerometer. An inertial sensor may be used herein to refer a motion sensor (e.g., a velocity sensor, an acceleration sensor such as an accelerometer), an orientation sensor (e.g., a gyroscope, inclinometer), or an IMU having one or more integrated motion sensors and/or one or more integrated orientation sensors. An inertial sensor may provide sensing data relative to a single axis of motion. The axis of motion may correspond to an axis of the inertial sensor (e.g., a longitudinal axis). A plurality of inertial sensors can be used, with each inertial sensor providing measurements along a different axis of motion. For example, three accelerometers can be used to provide acceleration data along three different axes of motion. The three directions of motion may be orthogonal axes. One or more of the accelerometers may be linear accelerometers configured to measure acceleration along a translational axis. Conversely, one or more of the accelerometers may be angular accelerometers configured to measure angular acceleration around a rotational axis. As another example, three gyroscopes can be used to provide orientation data about three different axes of rotation. The three axes of rotation may be orthogonal axes (e.g., roll axis, pitch axis, yaw axis). Alternatively, at least some or all of the inertial sensors may provide measurement relative to the same axes of motion. Such redundancy may be implemented, for instance, to improve measurement accuracy. Optionally, a single inertial sensor may be capable of providing sensing data relative to a plurality of axes. For example, an IMU including a plurality of accelerometers and gyroscopes can be used to generate acceleration data and orientation data with respect to up to six axes of motion. Alternatively, a single accelerometer can be used to detect acceleration along multiple axes, and a single gyroscope can be used to detect rotation about multiple axes.

In some embodiments, a carrier may comprise at least one inertial sensor attached to the frame. FIG. 5 illustrates an example of an inertial measurement unit (IMU) 501 attached to a frame 503 of a carrier, in accordance with embodiments. The frame 503 may be controlled to be rotatable relative to a stator 505 actuated by a plurality of actuators 511. The stator 505 may be rigidly or rotatably connected to a base support via a mechanical structure 507 (the mechanical structure 507 may correspond to the mechanical structure 211 in FIG. 2 or 307 in FIG. 3). The payload sensor can be situated on any suitable portion of the frame, such as above, underneath, on the side(s) of, or within a body of the payloads carried by the frame. Some sensors can be mechanically coupled to the frame such that the spatial disposition and/or motion of the frame correspond to the spatial disposition and/or motion of the sensors. The sensor can be coupled to the frame via a rigid coupling, such that the sensor does not move relative to the portion of the frame to which it is attached. Alternatively, the coupling between the sensor and the frame can permit movement of the sensor relative to the payload. The coupling can be a permanent coupling or non-permanent (e.g., releasable) coupling. Suitable coupling methods can include adhesives, bonding, welding, and/or fasteners (e.g., screws, nails, pins, etc.). Optionally, the sensor can be integrally formed with a portion of the frame. Furthermore, the sensor can be electrically coupled with a portion of the payload (e.g., processing unit, control system, data storage).

In some embodiments, one or more sensors can be attached to one payload 509 or at least one payload 509 selected from the plurality of payloads. The sensor(s) can be enclosed within a housing of the payload, positioned outside the housing, coupled to a surface (e.g., inner or outer surface) of the housing, or can form part of the housing. The sensor(s) may be situated on the frame and positioned on or in proximity to a payload selected from the plurality of payloads. For instance, the sensor may be located on a surface of the ring shape frame (for example the frame 407 in FIG. 4) and in proximity to one of the payloads (e.g., 401-3). The at least one payload may be the one that is direction sensitive. The at least one payload may be the one that requires stabilization while it is functioning. The at least one payload may be the major functional payload that a desired attitude or orientation of the payload may be controlled by the carrier. In some embodiments, the distance between the sensor and the payload is predetermined. In some cases, when a single sensor is used, the sensor may be arranged to be located in proximity to a major functioning payload or the payload that needs to be controlled or stabilized.

In some embodiments, as the payloads 509 are rigidly coupled to the frame 503, various motion characteristics of the payloads such as position, attitude, angular velocity, angular acceleration can be controlled by controlling the motion of the frame. In some cases, all of the payloads may be controlled simultaneously. In some embodiments, the location or position of the plurality of payloads on the frame is known to a control system such that the attitude of a particular of some of the payloads may be adjusted according to the control signal. For example, the frame can be controlled such that one or some of the payloads such as a major camera may be directed at a desired direction.

In some embodiments, using an inertial sensor to detect the motor of the carrier may allow for a compact size, light weight and simple structure of the carrier. Compare to conventional methods using rotary encoders and complex structures for example guiding rails associated with each rotational axis, the present disclosure may permit greater range of movement, compact size and simple structure.

Figure 6:
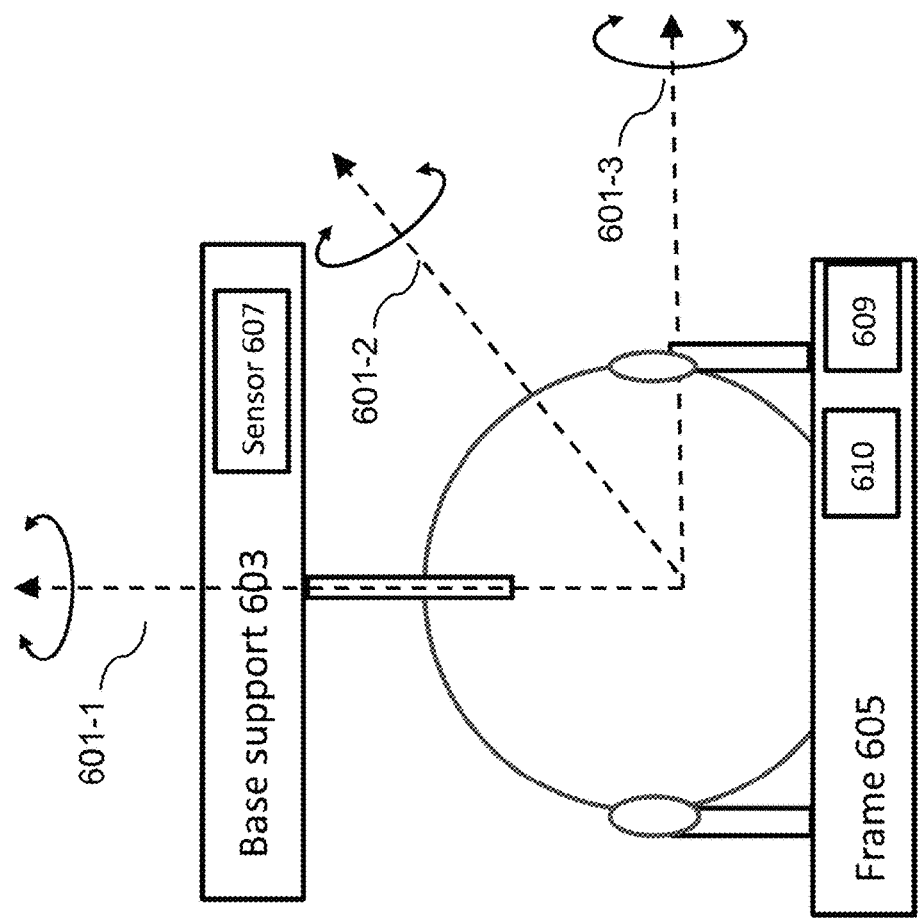
FIG. 6 illustrates an exemplary sensor calibration mechanism, in accordance with embodiments of the disclosure.

In some embodiments, the payload sensor may be calibrated for controlling the carrier. In some embodiments, the calibration may be performed at initial of the control process. FIG. 6 illustrates an exemplary sensor calibration mechanism, in accordance with embodiments of the disclosure.

In some embodiments, the payload sensor 609 may be an inertial sensor configured to detect a position or attitude of the frame. The inertial sensor may be located on the frame 605 or with the payloads 610. The inertial sensor as described previously may comprise at least a magnetometer, a gyroscope and accelerometer. In some embodiments, the accelerometer and/or gyroscope of the inertial sensor may be used to detect an angular position of the frame 605 about the roll axis and pitch axis 601-2, 601-3. The angular position of the frame 605 about the yaw axis 601-1 may be detected by a magnetometer (e.g., compass) of the inertial sensor. Accordingly, the attitude of the frame with respective to a fixed reference frame (e.g., the surrounding environment, ground, etc) may be determined.

In some embodiments, a sensor 607 may be used to measure the attitude of the base support 603. The sensor 607 may be located on the base support or the movable object that the base support is rigidly attached to. The sensor 607 may be an inertial sensor configured to detect a position or attitude of the base support 603 or the movable object. The inertial sensor 607 as described previously may comprise at least a magnetometer, a gyroscope and accelerometer. In some embodiments, the angular position of the base support 603 about the yaw axis 601-1 may be detected by a magnetometer (e.g., compass) of the inertial sensor. Accordingly, the attitude angle about the yaw axis of the base support with respective to a fixed reference frame (e.g., the surrounding environment, ground, etc) may be determined. In some cases, the yaw angle position may be related to a heading direction of the movable object.

In some embodiments, the carrier may be calibrated by obtaining a relative position between the frame and the base support, or the position of the frame with respect to a fixed reference frame such as ground. The carrier may adjust the attitude angle of the frame about roll and/or pitch axis based on the angular position measured by the inertial sensor located on the frame. The carrier may adjust the attitude angle of the frame about the yaw axis based on the angular position of the frame with respect to a fixed reference frame (e.g. ground) or with respect to the movable object.

Figure 7:
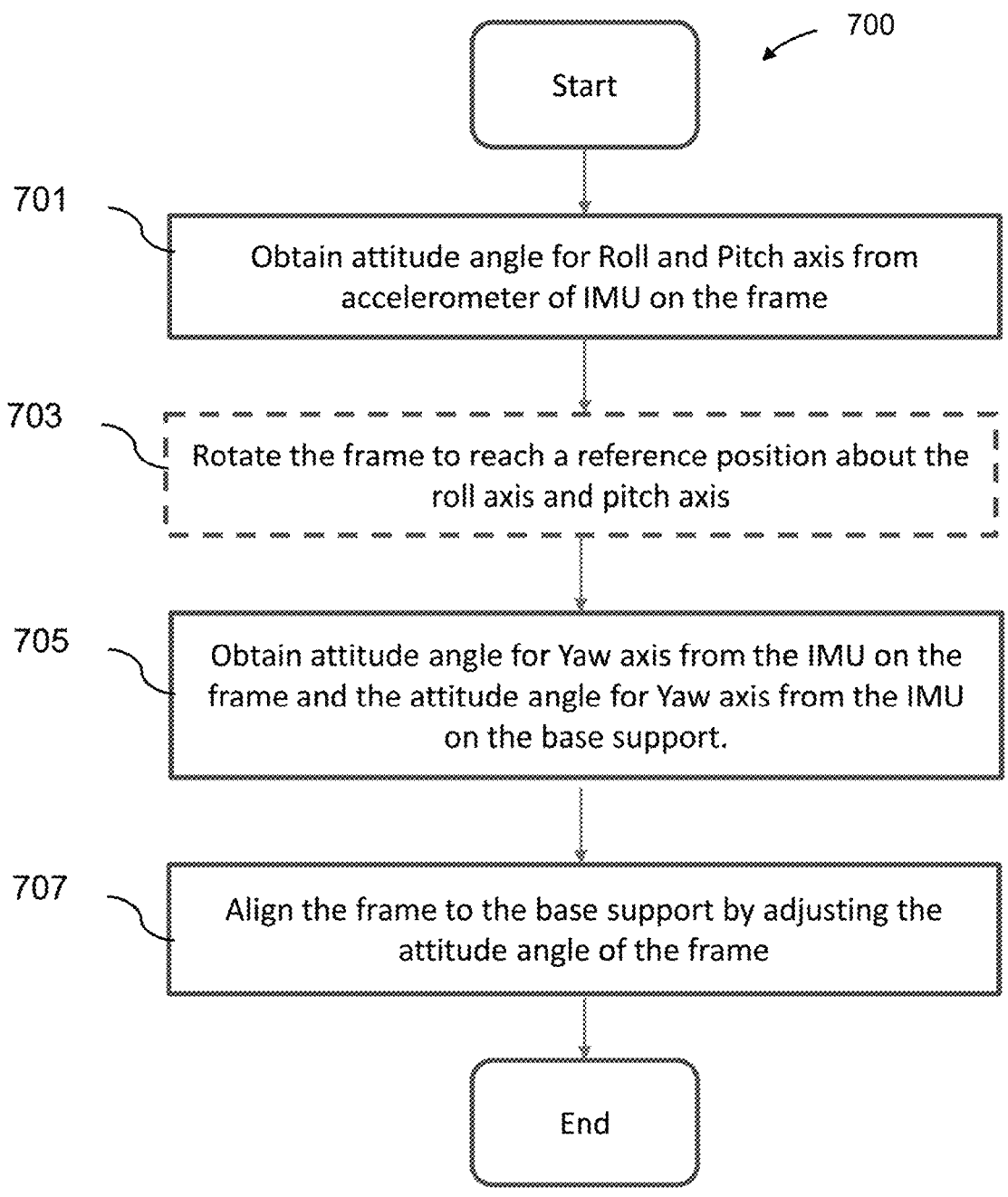
FIG. 7 illustrates an exemplary initialization process 700, in accordance with embodiments of the disclosure.

FIG. 7 illustrates an exemplary initialization process 700, in accordance with embodiments of the disclosure. The method can be performed using any embodiment of the system and apparatuses as described herein. In some embodiments, the initialization method can be performed using one or more processors of a controller, e.g., located on a movable object, carrier, and/or payload. The controller can be configured to effect movement of the carrier to achieve a desired attitude of the payload. The initialization process 700 may be used for calibration of motion sensors (e.g., inertial sensors) with respect to two or three rotational axes.

The axes may include at least a yaw axis. In some cases, the payload sensors may be calibrated about the three rotational axes.

In step 701, an attitude angle about roll axis and/or pitch axis are determined based on the angular position measured by the payload sensor located on the carrier. The payload sensor may be an inertial sensor located on or in proximity to the payload. The payload sensor can be the same sensor 609 as described in FIG. 6. In some embodiments, the carrier may be controlled to move about three rotational axes such as roll axis, pitch axis, and yaw axis. The payload sensor (e.g., IMU) may measure the attitude angle for roll axis and pitch axis. One or more types of sensors in the IMU may be included in step 701. For example, frame of the gyroscope(s) may be aligned with the frame of accelerometer before the gyroscopes and accelerometers used to measure the attitude angle for roll axis and pitch axis. In another example, only the accelerometer(s) are used to measure the attitude angle for roll axis and pitch axis. Alternatively, the carrier may be controlled to move about two rotational axes such as yaw axis and roll/pitch axis. Similarly, only the accelerometer(s) of the IMU or both the gyroscopes and accelerometers of the IMU may be used to detect the attitude angle of the frame about the roll or pitch axis. The attitude angle measured by the accelerometer(s) may be relative to a fixed frame such as the ground.

In step 703, the carrier frame may be rotated about the roll axis and/or pitch axis to reach a reference position attitude angle about the roll axis and/or pitch axis as detected by the inertial sensor. In some embodiments, the reference position may be relative to a fixed frame such as the ground surface. For example, the reference position may be a zero attitude angle about the roll and/or pitch axis relative to the ground. In some cases, the inertial sensor is installed in a way that the axis of the inertial sensor is substantially parallel or aligned with axis of the frame or payloads. In this case, after rotating of the frame to reach a zero angle, the frame and/or payload may be leveled or parallel to the ground. In other cases, the frame axis of the inertial sensor may not be aligned with the frame axis of payload or carrier frame and a transformation matrix can be determined between the two frames. In this case, after rotation of the frame to reach a zero angle as detected by the inertial sensor, the frame and/or payload may or may not be leveled or parallel to the ground surface. In alternative embodiments, the reference position may be relative to the object that the carrier is attached to. The carrier frame may be rotated about the roll axis and/or pitch axis such that the frame of the carrier frame may be aligned with the frame of the base support. For example, the carrier frame may be rotated so that the yaw axis of the frame is parallel to the yaw axis of the base support. In these alternative embodiments, step 703 may be optional and the alignment of the yaw axis may be performed in step 707.

In step 705, an attitude angle about the yaw axis for the frame may be obtained from the payload sensor located on the carrier frame and an attitude angle about the yaw axis for the base support may be obtained from the inertial sensor located on the base support. The payload sensor may be an inertial sensor located on or in proximity to the payload. The payload sensor can be the same sensor calibrated in step 701. In some cases, the magnetometer(s) of the inertial sensor may be used for measure of the attitude angle about the yaw axis. The attitude angle measured by the magnetometer(s) may be relative to a fixed frame such as the ground. The inertial sensor used to measure the angle about the yaw axis for the base support can be located on the base support or on any portion of the movable object that the base support is rigidly attached to. The inertial sensor for base support can be the same sensor 607 as described in FIG. 6.

In step 707, the carrier frame may be aligned to the base support by adjusting the attitude angle of the carrier frame based on the attitude angle of the base support. In some embodiments, after step 703, a yaw axis of the frame may be aligned with the yaw axis of the base support. Subsequently, the frame may be rotated about the yaw axis to align the frame to the reference position. The reference position may be determined based on an attitude of the base support. For example, the reference position may be a heading direction of the movable object. In some cases, additional sensor(s) may be used to measure the rotational movement of the stator relative to the base support about the yaw axis such as an optical encoder or a magnetic field sensor (e.g., angular potentiometer/encoder). Accordingly, when the frame of the carrier frame aligned with the base support, the reference position may be used as a reference position for the additional sensor(s) for the yaw axis.

In some embodiments, step 703 may be performed with step 707. Accordingly, the attitude angle of the frame about the roll, and/or pitch axis and yaw axis may be adjusted to be aligned with a corresponding reference position. The reference position for each attitude angle about each axis may be determined in different reference frame. For example, the reference position for the attitude angle about the yaw axis may be determined using the reference frame of the movable object such that the frame may be aligned with a heading direction of the movable object. Optionally, the reference position for each attitude angle about each axis may be determined in the same reference frame. For example, the attitudes angle about the all three or two axes may be adjusted to be aligned with a fixed reference frame (e.g., ground).

The order of adjusting the attitude angles about the roll axis, pitch axis and yaw axis can change. For example, the frame can be rotated about the roll axis and pitch axis followed by a rotation about the yaw axis. Alternatively, the frame can be rotated about the yaw axis followed by a rotation about the roll axis and/or pitch axis.

It should be noted that various other sensors can be used to provide attitude data of the carrier such as potentiometers or encoders. The various other sensors may be arranged to measure the angular velocity, angular acceleration and/or angular position of the frame relative to the stator of the spherical stator with respect to up to three axes. These sensors may be incremental or absolute positional sensors. These sensors may or may not require a calibration of initialization process before used for controlling the carrier. When a calibration process is required, these sensors may be calibrated to a reference position using the frame of the movable object or a fixed frame such as the ground.

As discussed above and herein, the carrier can be used to control the spatial disposition (e.g., position and/or orientation) of a coupled payload. For instance, the carrier can be used to move (e.g., translate and/or rotate) the payload to a desired spatial disposition. The desired spatial disposition can be manually input by a user (e.g., via remote terminal or other external device in communication with the movable object, carrier, and/or payload), determined autonomously without requiring user input (e.g., by one or more processors of the movable object, carrier, and/or payload), or determined semi-autonomously with aid of one or more processors of the movable object, carrier, and/or payload. The desired spatial disposition can be used to calculate a movement of the carrier or one or more components thereof (e.g., one or more frames) that would achieve the desired spatial disposition of the payload.

The plurality of piezoelectric actuators of the carrier may be configured to effect a movement of the frame based on a target angle. For example, in some embodiments, a target angle (e.g., a yaw angle) associated with a desired attitude of the payload is received by one or more processors (e.g., of the movable object, carrier, and/or payload).

In some embodiments, the one or more processors can be programmable (e.g., a central processing unit (CPU) or a microcontroller), a field programmable gate array (FPGA), DSP, ASICs, PLC and/or one or more ARM processors, etc. The one or more processors can be located on the carrier platform or operatively coupled to the carrier platform. Based on the input angle, the one or more processors can determine an input torque to be applied to the carrier or one or more components thereof (e.g., a yaw frame) in order to achieve the desired attitude.

The input torque can be determined in a variety of ways, such as using a feedback control loop. The feedback control loop can take the target angle as an input and output the input torque as an input signal to the actuators of the carrier. The feedback control loop can be implemented using one or more of a proportional (P) controller, a proportional-derivative (PD) controller, a proportional-integral (PI) controller, a proportional-integral-derivative (PID) controller, or combinations thereof. The PID controller may comprise the one or more processors. The PID controller may be located on the carrier. The PID controller can be located remotely from the carrier. The PID controller for example can be located at the base support.

Figure 8:
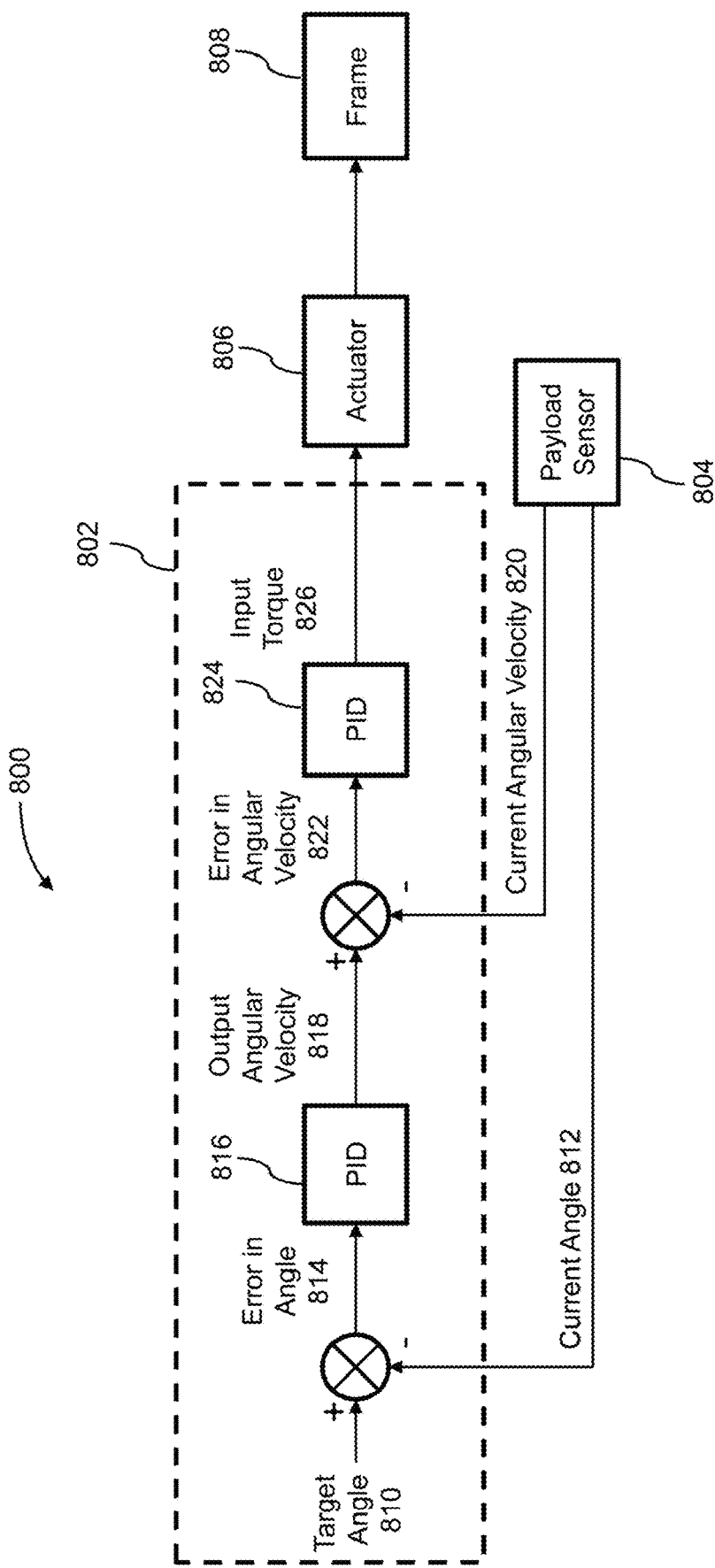
FIG. 8 illustrates a block diagram of a feedback control loop for controlling an attitude of a payload, in accordance with embodiments.

FIG. 8 illustrates a block diagram of a feedback control loop 800 for controlling an attitude of a payload, in accordance with embodiments. The payload may be coupled to a frame of the carrier as described elsewhere herein. The feedback loop 800 can include a processor 802 (e.g., a digital signal processor (DSP)), a payload sensor 804, an actuator 806 (e.g., piezoelectric actuators, motors), and a frame 808. The processor 802 can be located on the movable object, carrier, or payload. Alternatively, rather than using a single processor 802, multiple processors can be used, each of which is independently located on the movable object, carrier, or payload. The frame 808 can be the frame that is coupled to the plurality of piezoelectric actuators and configured to support multiple payloads, and the actuator 806 can include a plurality of piezoelectric actuators coupled to the frame 808 in order to rotate the frame 808 about two or more axes (e.g., roll, pitch axis) relative to the spherical stator and a motor coupled to the spherical stator to rotate the stator about an axis, such as a yaw axis.

The payload sensor(s) 804 can be any sensor suitable for obtaining data indicative of a spatial disposition (e.g., position, orientation, angle) and/or motion characteristic (e.g., translational (linear) velocity, angular velocity, translational (linear) acceleration, angular acceleration) of a payload, such as an inertial sensor. An inertial sensor may be used herein to refer to a motion sensor (e.g., a velocity sensor, an acceleration sensor such as an accelerometer), an orientation sensor (e.g., a gyroscope, inclinometer), or an IMU having one or more integrated motion sensors and/or one or more integrated orientation sensors. An inertial sensor may provide sensing data relative to a single axis of motion. The axis of motion may correspond to an axis of the inertial sensor (e.g., a longitudinal axis). A plurality of inertial sensors can be used, with each inertial sensor providing measurements along a different axis of motion. For example, three accelerometers can be used to provide acceleration data along three different axes of motion. The three directions of motion may be orthogonal axes. One or more of the accelerometers may be linear accelerometers configured to measure acceleration along a translational axis. Conversely, one or more of the accelerometers may be angular accelerometers configured to measure angular acceleration around a rotational axis. As another example, three gyroscopes can be used to provide orientation data about three different axes of rotation. The three axes of rotation may be orthogonal axes (e.g., roll axis, pitch axis, yaw axis). Alternatively, at least some or all of the inertial sensors may provide measurement relative to the same axes of motion. Such redundancy may be implemented, for instance, to improve measurement accuracy. Optionally, a single inertial sensor may be capable of providing sensing data relative to a plurality of axes. For example, an IMU including a plurality of accelerometers and gyroscopes can be used to generate acceleration data and orientation data with respect to up to six axes of motion. Alternatively, a single accelerometer can be used to detect acceleration along multiple axes, and a single gyroscope can be used to detect rotation about multiple axes.

The payload sensor(s) 804 can be carried by the payload. The payload sensor can be situated on any suitable portion of the payload, such as above, underneath, on the side(s) of, or within a body of the payload. In some embodiments, one or more sensors can be enclosed within a housing of the payload, positioned outside the housing, coupled to a surface (e.g., inner or outer surface) of the housing, or can form part of the housing. Some sensors can be mechanically coupled to the payload such that the spatial disposition and/or motion of the payload correspond to the spatial disposition and/or motion of the sensors. The sensor can be coupled to the payload via a rigid coupling, such that the sensor does not move relative to the portion of the payload to which it is attached. Alternatively, the coupling between the sensor and the payload can permit movement of the sensor relative to the payload. The coupling can be a permanent coupling or non-permanent (e.g., releasable) coupling. Suitable coupling methods can include adhesives, bonding, welding, and/or fasteners (e.g., screws, nails, pins, etc.). In some embodiments, the coupling between the sensor and the payload comprises shock absorbers or dampers that reduce vibrations or other undesirable mechanical movements from being transmitted from the payload body to the sensor. Optionally, the sensor can be integrally formed with a portion of the payload. Furthermore, the sensor can be electrically coupled with a portion of the payload (e.g., processing unit, control system, data storage). In alternative embodiments, the payload sensor(s) 804 may not necessarily be directly coupled to the payload, but may be connected to another component that is directly coupled to the payload, such as a frame.

Some sensors can be mechanically coupled to the carrier such that the spatial disposition and/or motion of the carrier correspond to the spatial disposition and/or motion of the sensors. The sensor can be coupled to the carrier via a rigid coupling, such that the sensor does not move relative to the portion of the carrier to which it is attached. Alternatively, the coupling between the sensor and the carrier can permit movement of the sensor relative to the carrier. The coupling can be a permanent coupling or non-permanent (e.g., releasable) coupling. Suitable coupling methods can include adhesives, bonding, welding, and/or fasteners (e.g., screws, nails, pins, etc.). In some embodiments, the coupling between the sensor and the carrier comprises shock absorbers or dampers that reduce vibrations or other undesirable mechanical movements from being transmitted from the carrier to the sensor. Optionally, the sensor can be integrally formed with a portion of the carrier. Furthermore, the sensor can be electrically coupled with a portion of the carrier (e.g., processing unit, control system, data storage).

In alternative embodiments, the sensor(s) may not necessarily be directly coupled to the carrier, but may be connected to another component that is directly coupled to the carrier, such as a damping element or a coupling structure connecting the carrier to the damping element. As discussed above and herein, the damping element may be interposed between the carrier and a movable object so as to reduce transmission of unwanted motions from the movable object to the carrier. A coupling structure may be used to connect the carrier or a portion thereof (e.g., a frame of the carrier) to the damping element. The one or more sensors can be located on the damping element and/or coupling structure so as to provide data regarding any external disturbances experienced by the carrier.

One or more inertial sensors 804 may be used to detect the motion and attitude of the payload(s). As discussed elsewhere herein, the inertial sensor(s) 804 can be located on any portion of the frame. The inertial sensor(s) 804 can be the same inertial sensor(s) 501 as described in FIG. 5.

In some embodiments, the inertial sensor(s) 804 may be calibrated to a reference frame. The reference frame can be the frame of the movable object that the carrier is coupled to. The reference frame can be a fixed frame such as the ground surface.

The processor 802 can receive a target angle 810 associated with a desired attitude of the payload (e.g., a roll angle). For instance, the target angle 810 can be an angle of the frame 808 that would achieve the desired attitude of the payload. The target angle 810 can be an attitude angle of the frame relative to a fixed frame or the movable object.

The processor 802 can also receive a current angle 812 associated with a current or instantaneous attitude of the payload from one or more payload sensors 804. For example, the angle 812 can be calculated by an integration of angular velocity derived from the gyroscope(s) of the inertial sensor. The current angle 812 can be a current angle of the frame 808 corresponding to the current attitude of the payload. In some embodiments, the one or more payload sensors 804 output data indicative of an angle of the payload, and the current angle 812 of the frame 808 can be calculated based on the angle of the payload and/or information regarding the angles of other payload components (e.g., other carrier frames). Optionally, a rotation matrix can be used to convert the payload angle to the current angle 812.

The processor 802 can calculate the difference between the input angle 810 and the current angle 812, also referred to as the "error" in the angle 814. The error in the angle 814 can be input into a first PD controller 816. The first PD controller 816 can be implemented according to methods known to those of skill in the art. The first PD controller 816 can output an output angular velocity 818. The output angular velocity 818 can correspond to an angular velocity at which the frame 818 should be rotated in order to achieve the desired attitude of the payload.

The processor 802 can calculate the difference between the output angular velocity 818 and a current angular velocity 820 received from the payload sensor(s) 804, also known as the "error" in the angular velocity 822. For example, the angular velocity 820 can be calculated based on the gyroscopes of the inertial sensors. The current angular velocity 820 can be associated with a current or instantaneous angular velocity of the payload. For instance, the current angular velocity 820 can be a current angle of the frame 808 corresponding to the current angular velocity of the payload. In some embodiments, the one or more payload sensors 804 output data indicative of an angular velocity of the payload, and the current angular velocity 820 of the frame 808 can be calculated based on the angular velocity of the payload and/or information regarding the angular velocities of other payload components (e.g., other carrier frames). Optionally, a transformation matrix can be used to convert the payload angular velocity to the current angular velocity 820.

The error in the angular velocity 822 can be input into a second PD controller 824. The second PD controller 824 can be implemented according to methods known to those of skill in the art. The second PD controller 824 can output an input torque 826. The input torque 826 can correspond to a torque which should be applied to the frame 808 in order to achieve the desired attitude of the payload. The processor 802 can transmit instructions to the actuator 806 to cause the actuator 806 to apply the output torque 826 to the frame 808.

As mentioned previously, the actuator 806 can include a plurality of piezoelectric actuators to rotate the frame 808 about at least one of a pitch axis or a roll axis, a motor coupled to the spherical stator to rotate the stator about at least a yaw axis, or a combination thereof. In some embodiments, when only a single spherical motor is used to actuate the frame, the payload sensor 804 may include a first inertial sensor configured to measure an attitude angle of the frame about the rotational axes (e.g., roll axis, pitch axis and yaw axis). In some embodiments, when a spherical motor is used for actuation about at least one of a pitch axis or a roll axis and a motor for actuation of at least a yaw axis, the payload sensor 804 may include a first inertial sensor configured to measure an attitude angle of the frame about the at least roll axis or pitch axis, and a second inertial sensor may be configured to measure an attitude angle of the frame about the yaw axis. Optionally, the second inertial sensor may be configured to measure an attitude angle of the base support about the yaw axis.

In some embodiments, the first inertial sensor may be located on the frame or the payloads and the second inertial sensor may be located on the base support or the movable object the carrier is attached to. The first inertial sensor may be in communication with the second inertial sensor during actuation of the one or more payloads supported on the carrier. In some embodiments, the first inertial sensor may be initialized with respect to the second inertial sensor prior to actuation of one or more payloads supported on the carrier.

In other embodiments, when a spherical motor is used for actuation about at least one of a pitch axis or a roll axis and a motor for actuation of at least a yaw axis, the payload sensor 804 may include a first inertial sensor configured to measure an attitude angle of the frame about the at least roll axis or pitch axis, and a second inertial sensor may be configured to measure an attitude angle of the frame about the yaw axis. Optionally, the second inertial sensor may be configured to measure an attitude angle of the base support about the yaw axis.

In some embodiments, the input torque 806 may be converted to input signals to actuate the one or more types of actuators 806 included in the carrier. The actuator 806 can include a plurality of piezoelectric actuators to rotate the frame 808 about at least one of a pitch axis or a roll axis, a motor coupled to the spherical stator to rotate the stator about at least a yaw axis, or a combination thereof. The angular velocity of each actuator may or may not be aligned with the frame axis (e.g., roll axis, pitch axis and yaw axis). The input signal for controlling each actuator may be determined based on the specific motor specifications, kinematics of the system, encoder types (e.g., incremental vs. absolute), and various other factors that are known to those skilled in the art.

Figure 9:
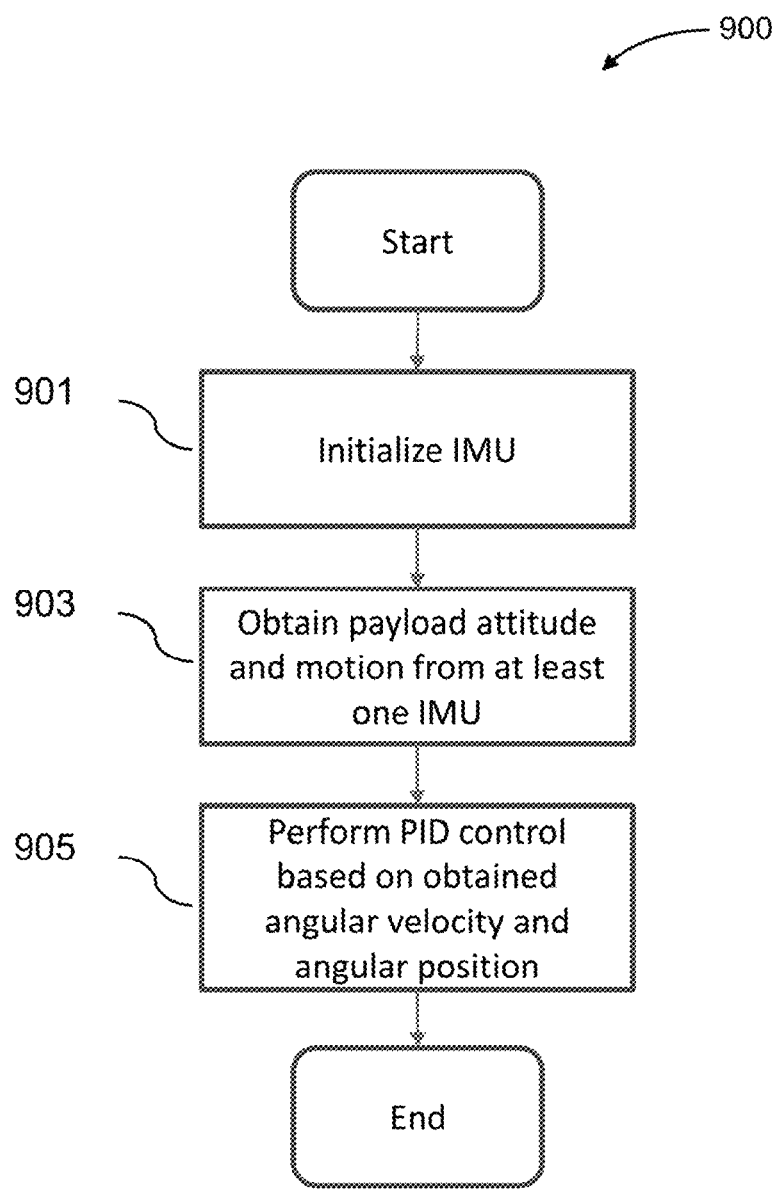
FIG. 9 shows an exemplary method for controlling the carrier, in accordance with the embodiments.

FIG. 9 shows an exemplary method for controlling the carrier, in accordance with the embodiments. The control method may use one or more inertial sensors to obtain attitude and/or motion data of the payload or frame. The method 900 can be performed using any embodiment of the systems and devices described herein. In some embodiments, the method 900 can be performed using one or more processors of a motion controller, e.g., located on a movable object, carrier, and/or payload. The motion controller can be configured to effect movement of the carrier to achieve a desired attitude of the payload.

In step 901, at least one inertial sensor may be calibrated or initialized prior to actuation of one or more payloads supported on the carrier. The inertial sensor may comprise gyroscope(s), accelerometer(s) and magnetometer(s). The calibration or initialization may include calibrating at least the gyroscope(s) and the accelerometers. In some embodiments, the at least one inertial sensor may be located on any portion of the frame or on the payloads. The inertial sensor located on the frame or payloads may be calibrated or initialized with respect to a second inertial sensor. The second inertial sensor may be located on the base support or any portion of a movable object that the base support is rigidly coupled to. The calibration may be performed by obtaining: (1) a relative position between the carrier frame and the base support, or (2) a relative position between the frame and a reference plane such as a ground surface. The initialization process/method can be the same as described in FIG. 7. In some cases, additional sensors may be used for controlling the carrier. For instance, additional sensor(s) may be used to measure the rotational movement of the stator relative to the base support about the yaw axis such as an optical encoder or a magnetic field sensor (e.g., angular potentiometer/encoder). The additional sensor(s) may also be calibrated with respect to a reference position. In some cases, calibration or initialization of the payloads sensors to the sensors located on the movable object allows for taking into account various effects of the movable object exerted on the carrier during the controlling process, or controlling the payloads or frame in accordance with the movable object.

In step 903, during control process of the carrier, one or more inertial sensors may be used for detecting at least one of a position, attitude, angular velocity, or angular acceleration of the frame or payloads. In some embodiments, only one inertial sensor is used to detect the motion characteristics of the frame or payloads. In some embodiments, motion and attitude data about the frame and payloads may be obtained from two or more inertial sensors. For example, the inertial sensor calibrated in step 901 may be in communication with the second inertial sensor during actuation of one or more payloads supported on the carrier. The first inertial sensor may be configured to measure an attitude angle of the frame about at least one of a pitch axis or a roll axis and the second inertial sensor is configured to measure an attitude angle of the frame about yaw axis. Optionally, the second inertial sensor is configured to measure an attitude angle of the base support about a yaw axis. In some cases, the data obtained from the sensors may be further processed by the one or more processors. For example, the angular velocity measured by the gyroscope may be integrated to obtain angular position. Other mathematic operations may include for example filtering the data to improve accuracy.

In step 905, the carrier may be controlled using one or more PID controllers. The plurality of piezoelectric actuators of the carrier and the one or more motors configured to rotate the stator relative to the base support may be configured to effect a movement of the frame based on a target angle. For example, in some embodiments, a target angle (e.g., a yaw angle) associated with a desired attitude of the payload is received by one or more processors (e.g., of the movable object, carrier, and/or payload). In some embodiments, the one or more processors can be programmable, such as PC, microcomputer, microcontroller, DSP, ASICs and PLC etc. The one or more processors can be located on the carrier platform or operatively coupled to the carrier platform. Based on the input angle, the one or more processors can determine an input torque to be applied to the carrier or one or more components thereof (e.g., a yaw frame) in order to achieve the desired attitude.

The input torque can be determined in a variety of ways, such as using a feedback control loop. The feedback control loop can take the target angle as an input and output the input torque as an input signal to the actuators of the carrier. The feedback control loop can be implemented using one or more of a proportional (P) controller, a proportional-derivative (PD) controller, a proportional-integral (PI) controller, a proportional-integral-derivative (PID) controller, or combinations thereof. The PID controller may comprise the one or more processors. The PID controller may be located on the carrier. The PID controller can be located remotely from the carrier. The PID controller for example can be located at the base support.

As described elsewhere herein, the PID controller may be configured to determine an input angular velocity based on a difference between the target angle and an angle measure by the inertial sensor(s). The PID controller may be configured to determine the input torque based on a difference between the input angular velocity and an angular velocity measured by the inertial sensor(s).

The systems, devices, and methods described herein can be applied to a wide variety of objects. The object can be static, such as a camera tripod. The object can be a movable object. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 10:
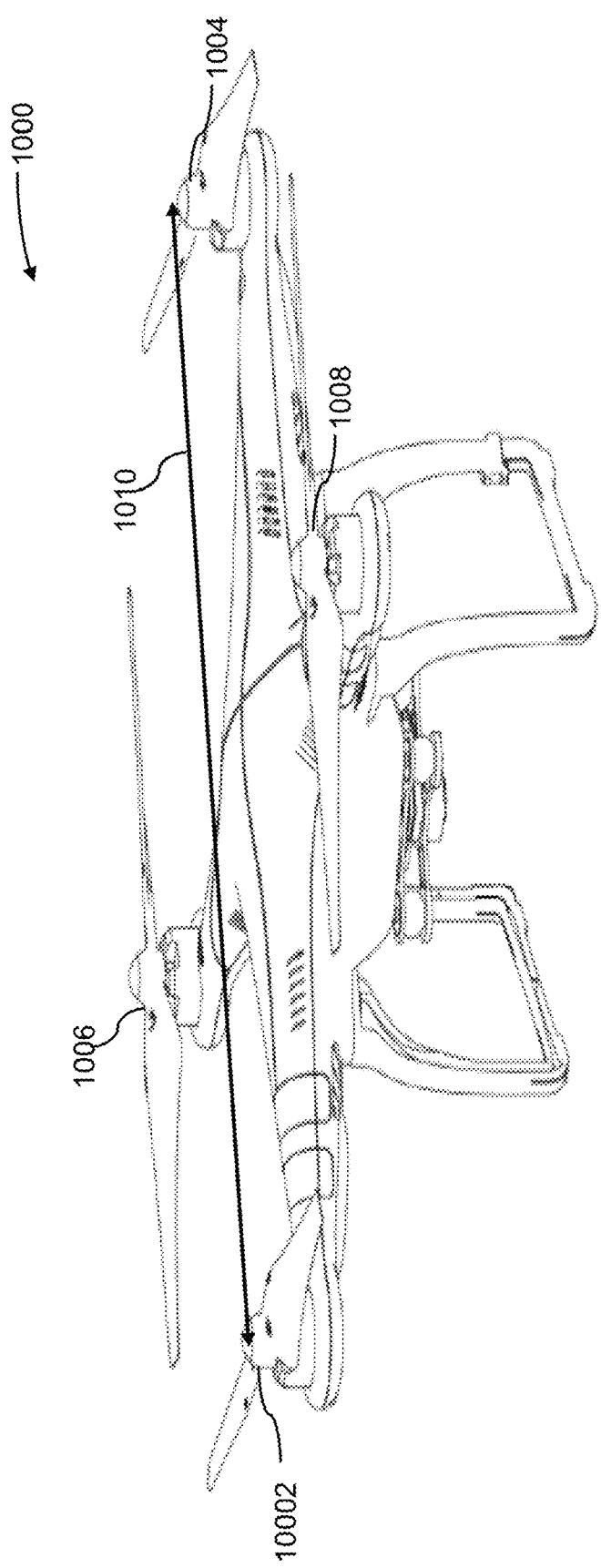
FIG. 10 illustrates an unmanned aerial vehicle (UAV), in accordance with embodiments of the present disclosure.

FIG. 10 illustrates an unmanned aerial vehicle (UAV) 1000, in accordance with embodiments of the present disclosure. The UAV may be an example of a movable object as described herein. The UAV 1000 can include a propulsion system having four rotors 1002, 1004, 1006, and 1008. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1010. For example, the length 1010 can be less than or equal to 2 m, or less than equal to 5 m. In some embodiments, the length 1010 can be within a range from 40 cm to 1 m, from 10 cm to 2 m, or from 5 cm to 5 m. Any description herein of a UAV may apply to a movable object, such as a movable object of a different type, and vice versa.

In some embodiments, the movement of the movable object, carrier, and payload are relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 11:
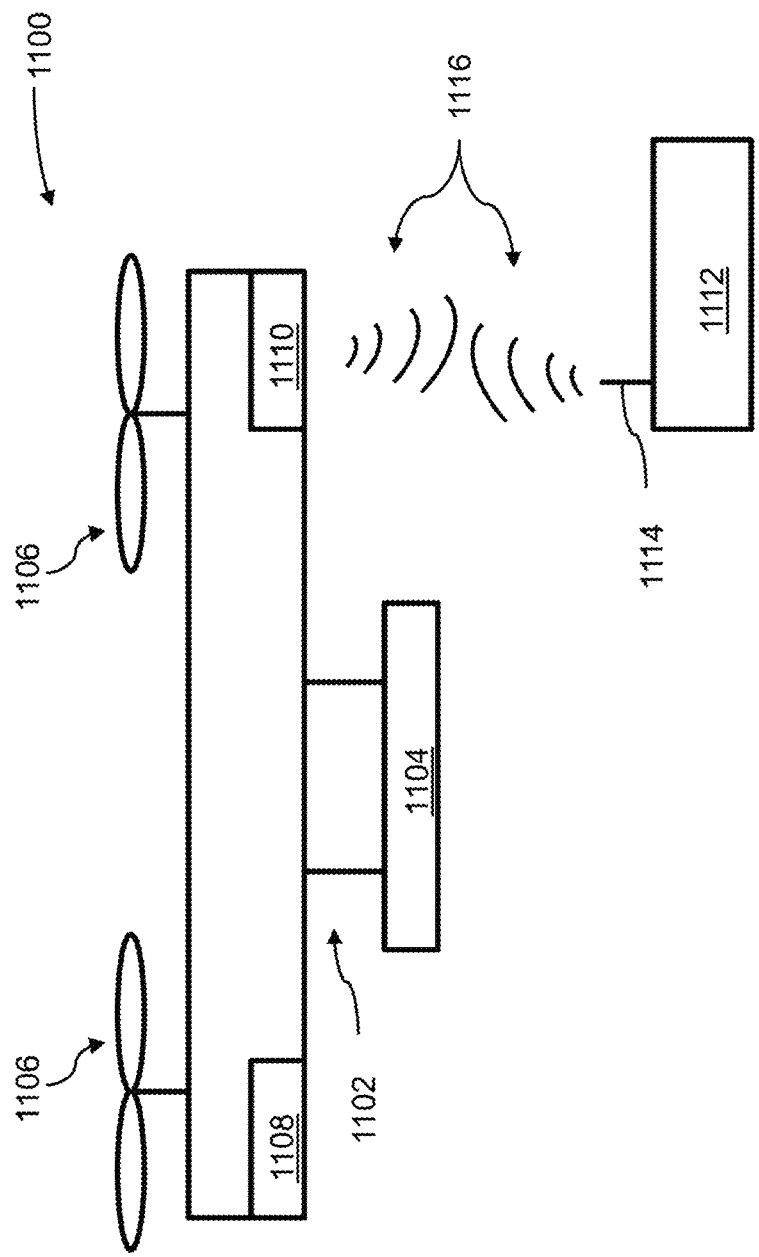
FIG. 11 illustrates a movable object including a carrier and a payload, in accordance with embodiments.

FIG. 11 illustrates a movable object 1100 including a carrier 1102 and a payload 1104, in accordance with embodiments. Although the movable object 1100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1104 may be provided on the movable object 1100 without requiring the carrier 1102. The movable object 1100 may include propulsion mechanisms 1106, a sensing system 1108, and a communication system 1110.

The propulsion mechanisms 1106 can include one or more of rotors, propellers, blades, engines, motors, wheels, axles, magnets, or nozzles, as previously described. For example, the propulsion mechanisms 1106 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1106 can be mounted on the movable object 1100 using any suitable means, such as a support element (e.g., a drive shaft) as described elsewhere herein. The propulsion mechanisms 1106 can be mounted on any suitable portion of the movable object 1100, such on the top, bottom, front, back, sides, or suitable combinations thereof.

In some embodiments, the propulsion mechanisms 1106 can enable the movable object 1100 to take off vertically from a surface or land vertically on a surface without requiring any horizontal movement of the movable object 1100 (e.g., without traveling down a runway). Optionally, the propulsion mechanisms 1106 can be operable to permit the movable object 1100 to hover in the air at a specified position and/or orientation. One or more of the propulsion mechanisms 1100 may be controlled independently of the other propulsion mechanisms. Alternatively, the propulsion mechanisms 1100 can be configured to be controlled simultaneously. For example, the movable object 1100 can have multiple horizontally oriented rotors that can provide lift and/or thrust to the movable object. The multiple horizontally oriented rotors can be actuated to provide vertical takeoff, vertical landing, and hovering capabilities to the movable object 1100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1100 (e.g., with respect to up to three degrees of translation and up to three degrees of rotation).

The sensing system 1008 can include one or more sensors that may sense the spatial disposition, velocity, and/or acceleration of the movable object 1100 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1108 can be used to control the spatial disposition, velocity, and/or orientation of the movable object 1100 (e.g., using a suitable processing unit and/or control module, as described below). Alternatively, the sensing system 1108 can be used to provide data regarding the environment surrounding the movable object, such as weather conditions, proximity to potential obstacles, location of geographical features, location of manmade structures, and the like.

The communication system 1110 enables communication with terminal 1112 having a communication system 1114 via wireless signals 1116. The communication systems 1110, 1114 may include any number of transmitters, receivers, and/or transceivers suitable for wireless communication. The communication may be one-way communication, such that data can be transmitted in only one direction. For example, one-way communication may involve only the movable object 1100 transmitting data to the terminal 1112, or vice-versa. The data may be transmitted from one or more transmitters of the communication system 1110 to one or more receivers of the communication system 1112, or vice-versa. Alternatively, the communication may be two-way communication, such that data can be transmitted in both directions between the movable object 1100 and the terminal 1112. The two-way communication can involve transmitting data from one or more transmitters of the communication system 1110 to one or more receivers of the communication system 1114, and vice-versa.

In some embodiments, the terminal 1112 can provide control data to one or more of the movable object 1100, carrier 1102, and payload 1104 and receive information from one or more of the movable object 1100, carrier 1102, and payload 1104 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1106), or a movement of the payload with respect to the movable object (e.g., via control of the carrier 1102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1108 or of the payload 1104). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1112 can be configured to control a state of one or more of the movable object 1100, carrier 1102, or payload 1104. Alternatively or in combination, the carrier 1102 and payload 1104 can also each include a communication module configured to communicate with terminal 1112, such that the terminal can communicate with and control each of the movable object 1100, carrier 1102, and payload 1104 independently.

In some embodiments, the movable object 1100 can be configured to communicate with another remote device in addition to the terminal 1112, or instead of the terminal 1112. The terminal 1112 may also be configured to communicate with another remote device as well as the movable object 1100. For example, the movable object 1100 and/or terminal 1112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1100, receive data from the movable object 1100, transmit data to the terminal 1112, and/or receive data from the terminal 1112. Optionally, the remote device can be connected to the Internet or other telecommunications network, such that data received from the movable object 1100 and/or terminal 1112 can be uploaded to a website or server.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A carrier comprising:
a stator configured to be coupled to a base support, the stator comprising a spherical surface; and
a frame operably coupled to the stator via a plurality of piezoelectric actuators,
wherein the frame is configured to:
rotate relative to the stator about one or more rotational axes, and
support a plurality of payloads in a manner that substantially balances a weight of the plurality of payloads relative to the stator.

2. The carrier of claim 1, wherein the frame comprises a ring located around the spherical surface of the stator.

3. The carrier of claim 2, wherein the plurality of payloads are uniformly distributed along the ring.

4. The carrier of claim 2, wherein the plurality of payloads are attached along the ring such that a center of gravity of the carrier with the payloads is offset from a spherical center of the stator.

5. The carrier of claim 4, wherein the center of gravity is offset from the spherical center of the stator along a yaw axis.

6. The carrier of claim 1, wherein the stator is rotatably coupled to the base support via a motor.

7. The carrier of claim 6, wherein the stator or the base support is attached to a rotor of the motor.

8. The carrier of claim 7, wherein a rotational position of the motor is determined using a magnetic field sensor.

9. The carrier of claim 6, wherein a housing of the motor is located at the base support.

10. The carrier of claim 6, wherein a housing of the motor is located at the stator.

11. The carrier of claim 10, wherein the housing of the motor is disposed below the spherical surface of the stator.

12. The carrier of claim 6, wherein the motor is configured to rotate the stator relative to the base support about a yaw axis.

13. The carrier of claim 12, wherein the one or more rotational axes of the frame relative to the stator comprise at least one of a pitch axis or roll axis.

14. The carrier of claim 13, wherein the one or more rotational axes of the frame relative to the stator further comprise the yaw axis.

15. The carrier of claim 1, wherein the piezoelectric actuators are uniformly distributed along a circle of the spherical surface of the stator.

16. The carrier of claim 15, wherein:
the stator is rotatable relative to the base support about a yaw axis using a motor; and
the plurality of piezoelectric actuators are uniformly distributed along a first circle, and configured to rotate the frame relative to the stator about a roll axis and a pitch axis.

17. The carrier of claim 15, wherein:
the stator is rigidly attached to the base support; and
the plurality of piezoelectric actuators are uniformly distributed along a second circle, and configured to rotate the frame relative to the stator about a roll axis, a pitch axis, and a yaw axis.

18. The carrier of claim 1, wherein the carrier is powered by an external power source.

19. The carrier of claim 18, wherein the external power source is located at the base support.

20. The carrier of claim 18, wherein:
the external power source includes a battery located onboard a movable object, and
the carrier is configured to be mechanically and electrically coupled to the movable object via the base support.

21. The carrier of claim 20, wherein power is delivered from the battery to the carrier through an electrical coupling in the base support.

* * * * *